US012033551B2

(12) United States Patent
Lee et al.

(10) Patent No.: US 12,033,551 B2
(45) Date of Patent: Jul. 9, 2024

(54) FAULT DETECTION DISPLAY APPARATUS AND OPERATION METHOD THEREOF

(71) Applicant: SAMSUNG ELECTRONICS CO., LTD., Suwon-si (KR)

(72) Inventors: Yilho Lee, Seoul (KR); Yongil Kwon, Suwon-si (KR); Sugyeung Kang, Suwon-si (KR); Tae-Hyeon Kwon, Seoul (KR); Sunkwon Kim, Hwaseong-si (KR); Hyunsang Park, Seongnam-si (KR); Uijong Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/212,981

(22) Filed: Jun. 22, 2023

(65) Prior Publication Data

US 2023/0343257 A1 Oct. 26, 2023

Related U.S. Application Data

(63) Continuation of application No. 17/701,065, filed on Mar. 22, 2022, now Pat. No. 11,715,399.

(30) Foreign Application Priority Data

Jul. 21, 2021 (KR) ........................ 10-2021-0096062

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2330/12* (2013.01)

(58) Field of Classification Search
CPC ....... G09G 3/006; G09G 3/32; G09G 2330/12
See application file for complete search history.

(56) References Cited

U.S. PATENT DOCUMENTS 10,529,271 B2 1/2020 Zhou et al.
10,891,882 B1 1/2021 Baroughi et al.
10,891,884 B1 1/2021 Yang et al.
(Continued)

FOREIGN PATENT DOCUMENTS

KR 10-2147401 B1 8/2020
KR 10-2020-0113787 A 10/2020

*Primary Examiner* — Gerald Johnson
(74) *Attorney, Agent, or Firm* — Sughrue Mion, PLLC

(57) ABSTRACT

Disclosed is integrated circuit panel which detects fault of a driving circuit. The integrated circuit panel includes: a driving circuit array including first and second driving circuits; a data driver configured to output first and second input data signals through first and second data lines, respectively; a switch driver configured to output a switching signal through a switch line; and an error detection driver configured to receive first and second output data signals through first and second test lines, respectively, wherein, in response to the switching signal, the first and second driving circuits are configured to output the first and second output data signals, which are based on the first and second input data signal, through the first and second test lines, respectively, and the error detection driver is configured to detect a fault of the first or second driving circuit based on the first or second output data signal.

20 Claims, 13 Drawing Sheets

(56) References Cited

U.S. PATENT DOCUMENTS

| | | | | |
|---|---|---|---|---|
| 10,930,201 | B1 | 2/2021 | Baroughi et al. | |
| 2004/0119730 | A1* | 6/2004 | Ham | G09G 3/3648<br>345/692 |
| 2020/0135153 | A1 | 4/2020 | Otawa et al. | |
| 2020/0341050 | A1 | 10/2020 | Hsiao | |
| 2022/0036831 | A1* | 2/2022 | Gray | H04B 3/54 |
| 2022/0172689 | A1 | 6/2022 | Watanabe | |

* cited by examiner

FAULT DETECTION DISPLAY APPARATUS AND OPERATION METHOD THEREOF

CROSS-REFERENCE TO RELATED APPLICATIONS

This is a Continuation of U.S. application Ser. No. 17/701,065 filed Mar. 22, 2022, which is based on and claims priority from Korean Patent Application No. 10-2021-0096062 filed on Jul. 21, 2021, in the Korean Intellectual Property Office, the disclosure of which is incorporated herein in its entirety by reference.

BACKGROUND

The present disclosure relates to a method of detecting a fault of a display apparatus. In detail, the present disclosure relates to a method of detecting a fault of each of driving circuits of a display apparatus.

A display apparatus refers to an apparatus converting a variety of information in a visual form to provide to a user. In general, the display apparatus includes a display panel in which a plurality of pixel circuits (or pixels) are implemented to express a variety of visual information depending on electrical signals, and an integrated circuit panel in which a plurality of driving circuits are implemented to drive the pixel circuits. A fault of the display apparatus may occur in the pixel circuits and the driving circuits.

The fault of the display apparatus may be visually detected by coupling the pixel circuits and the driving circuits and applying electrical signals thereto. However, in this case, it is difficult to determine whether a fault occurs in the pixel circuits or in the driving circuits. This may cause the reduction of the yield of production of the display apparatus.

SUMMARY

Various embodiments of the present disclosure provide a display apparatus configured to detect a fault of each of a plurality of driving circuits and an operation method thereof.

According to an embodiment, an integrated circuit panel which detects a fault of a driving circuit controlling a display panel may include: a driving circuit array that includes a first driving circuit and a second driving circuit, a data driver that outputs a first input data signal through a first data line and outputs a second input data signal through a second data line, a switch driver that outputs a first switching signal through a first switch line, and an error detection driver that receives a first output data signal through a first test line and receives a second output data signal through a second test line. The first driving circuit may store the first input data signal received through the first data line, and the second driving circuit may store the second input data signal received through the second data line. In response to the first switching signal received through the first switch line, the first driving circuit may output the first output data signal, which is based on the first input data signal, through the first test line. In response to the first switching signal received through the first switch line, the second driving circuit may output the second output data signal, which is based on the second input data signal, through the second test line. The error detection driver may detect a fault of the first driving circuit based on the first output data signal and may detect a fault of the second driving circuit based on the second output data signal.

According to an embodiment, an operation method of an integrated circuit panel, which detects a fault of a driving circuit controlling a display panel may include providing a first input data signal to a first driving circuit and providing a second input data signal to a second driving circuit, storing, by the first driving circuit, the first input data signal and storing, by the second driving circuit, the second input data signal, providing a first switching signal to the first driving circuit and the second driving circuit, outputting, by the first driving circuit, a first output data signal, which is based on the stored first input data signal, in response to the first switching signal and outputting, by the second driving circuit, a second output data signal, which is based on the stored second input data signal, in response to the first switching signal, and determining whether a fault has occurred in the first driving circuit based on the first output data signal and determining whether a fault has occurred in the second driving circuit based on the second output data signal.

According to an embodiment, a display apparatus may include an integrated circuit panel, and a display panel. The display panel may include a first pixel circuit and a second pixel circuit. The integrated circuit panel may include a driving circuit array that includes a first driving circuit and a second driving circuit, a data driver that outputs a first input data signal through a first data line and outputs a second input data signal through a second data line, a switch driver that outputs a switching signal through a switch line, and an error detection driver that receives a first output data signal through a first test line and receives a second output data signal through a second test line. The first driving circuit may store the first input data signal received through the first data line, and the second driving circuit may store the second input data signal received through the second data line. The first driving circuit may output a first driving signal to the first pixel circuit based on the stored first input data signal and may output the first output data signal to the error detection driver through the first test line in response to the switching signal. The second driving circuit may output a second driving signal to the second pixel circuit based on the stored second input data signal and may output the second output data signal to the error detection driver through the second test line in response to the switching signal. The error detection driver may determine a fault of the first driving circuit based on the first output data signal and may determine a fault of the second driving circuit based on the second output data signal.

BRIEF DESCRIPTION OF THE FIGURES

The above and other objects and features will become apparent by describing in detail embodiments thereof with reference to the accompanying drawings.

DETAILED DESCRIPTION

Below, embodiments will be described in detail and clearly to such an extent that one skilled in the art easily carries out the present disclosure. The details such as components and structures described in the specification are merely provided to assist the overall understanding of embodiments. Therefore, it should be apparent to those skilled in the art that various changes and modifications of the embodiments described herein may be made without departing from the scope and spirit of the present invention. Moreover, the descriptions of well-known functions and structures are omitted for the sake of clarity and brevity. In the following drawings or in the detailed description, components may be connected to any other components except for components that are illustrated in drawings or are described in the detailed description. The terms described below are terms defined in consideration of the functions and are not limited to a specific function. The definitions of the terms should be determined based on the contents throughout the specification.

Components that are described in the detailed description with reference to the terms "driver", "controller", "block", etc. may be implemented with software, hardware, or a combination thereof. For example, the software may be a machine code, firmware, an embedded code, and application software. For example, the hardware may include an electrical circuit, an electronic circuit, a processor, a microprocessor, a computer, integrated circuit cores, a pressure sensor, an inertial sensor, a microelectromechanical system (MEMS), a passive element, or a combination thereof.

Figure 1:
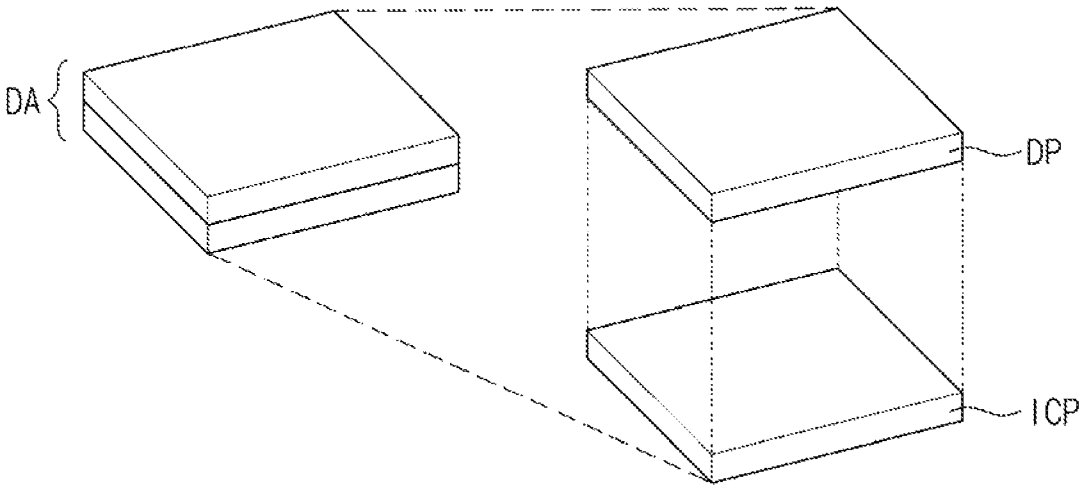
FIG. 1 is a structure diagram illustrating a display apparatus, according to an embodiment.

FIG. 1 is a structure diagram illustrating a display apparatus, according to an embodiment. Referring to FIG. 1, a display apparatus DA may include a display panel DP and an integrated circuit panel ICP. The display apparatus DA and the display panel DP are illustrated in FIG. 1 as being implemented in the form of a plane, but the present disclosure is not limited thereto. For example, a display panel may be implemented on a curved surface. For example, the present disclosure to be described below may also be applied to a flexible display apparatus, unless otherwise described contextually in the specification.

The display panel DP may include a plurality of pixel circuits which are also referred to as pixels. Each of the pixel circuits may include a light-emitting element. For example, the light-emitting element may include a light-emitting diode (LED), a micro LED, a laser diode, and/or anything similar thereto. Below, for brief description, an example in which each of the pixel circuits of the display panel DP includes the micro LED is described, but the present disclosure is not limited thereto.

In an embodiment, the pixel circuits may be arranged on the display panel DP depending in a given rule. For brief description, below, the description will be given under the assumption that the display panel DP includes rows of pixel circuits arranged on a straight line extending in a first direction and columns of pixel circuits arranged on a straight line extending in a second direction. However, the present disclosure is not limited thereto. Pixel circuits may be two-dimensionally arranged in a zigzag shape, or pixel circuits may be three-dimensionally arranged.

In an embodiment, the display panel DP may be implemented by various display panels such as a liquid crystal display panel, an organic light-emitting display panel, an electrophoretic display panel, and an electrowetting display panel. However, a display panel according to the present disclosure is not limited thereto. For example, the display panel according to the present disclosure may be implemented by the above-described display panel or a panel similar thereto.

The integrated circuit panel ICP may be coupled to a lower surface or a rear surface of the display panel DP. For example, the integrated circuit panel ICP may be coupled to the display panel DP to form the display apparatus DA.

In an embodiment, the integrated circuit panel ICP may include a plurality of driving circuits. The driving circuits may be connected to the pixel circuits of the display panel DP. For example, each of the driving circuits may apply a voltage or a signal to a light-emitting element (e.g., an LED, a micro LED, or a laser diode) of a pixel circuit. The connection relationship of a driving circuit and a pixel circuit will be described in detail with reference to FIG. 8.

In an embodiment, a fault of the display apparatus DA may independently occur in the display panel DP and/or the integrated circuit panel ICP. However, in the case where a fault is visually detected in a state where the display panel DP and the integrated circuit panel ICP are coupled, it is difficult to determine whether the fault is a fault of the display panel DP or a fault of the integrated circuit panel ICP. Below, a display panel driving method of the integrated circuit panel ICP and a method of detecting a fault occurring in each driving circuit included in the integrated circuit panel ICP, according to embodiments, will be described in detail.

Figure 2:
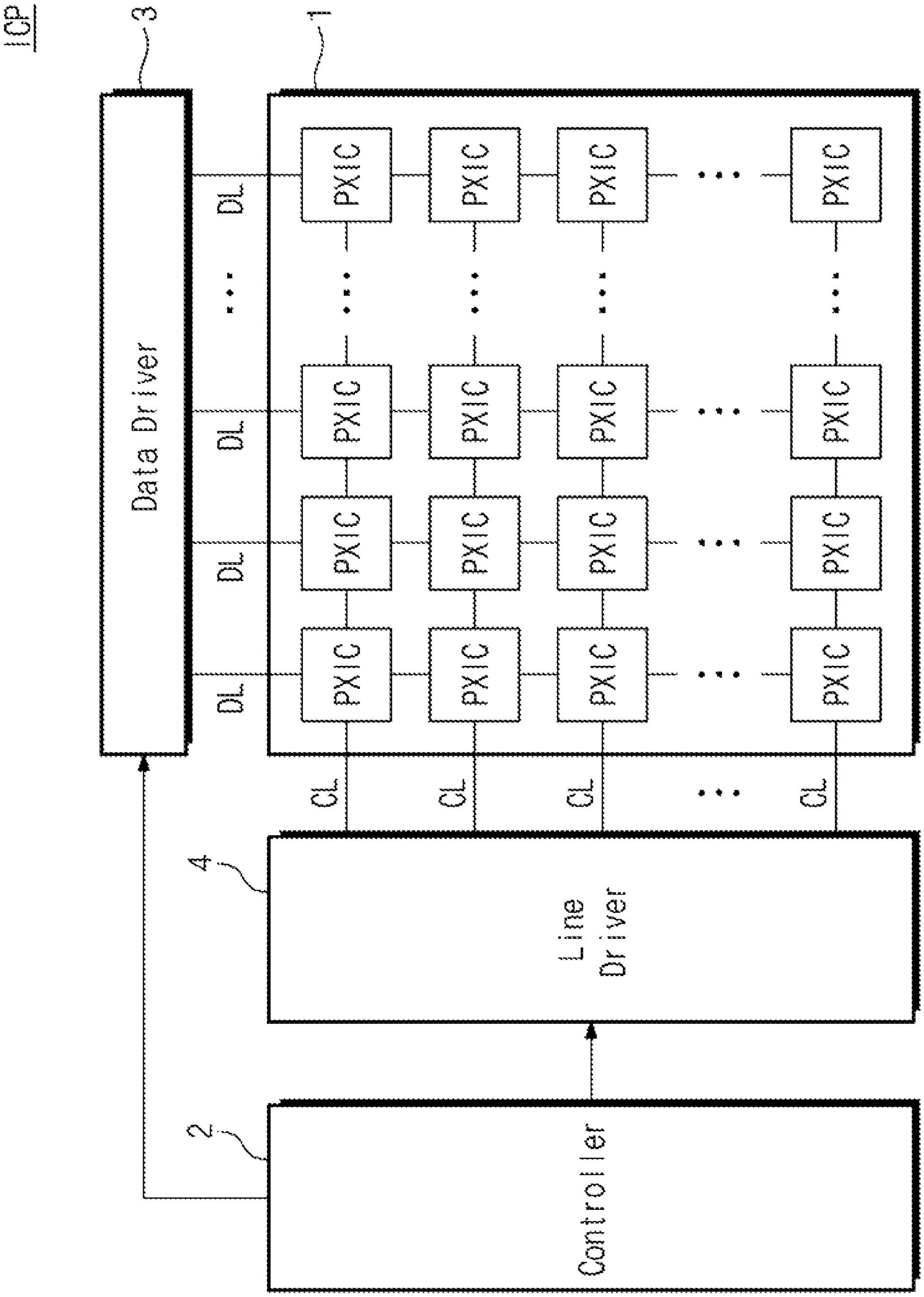
FIG. 2 illustrates an integrated circuit panel of FIG. 1 in detail, according to an embodiment.

FIG. 2 illustrates an integrated circuit panel of FIG. 1 in detail, according to an embodiment. Referring to FIGS. 1 and 2, the integrated circuit panel ICP may include a driving circuit array 1, a controller 2, a data driver 3, and a line driver 4. In an embodiment, the data driver 3 and the line driver 4 may control pixel circuits of the display panel DP through a plurality of driving circuits.

Below, for brief description, the description will be given under the assumption that the controller 2, the data driver 3, and the line driver 4 are components included in the integrated circuit panel ICP. However, the present disclosure is not limited thereto. The controller 2, the data driver 3, and the line driver 4 may be components that are present outside the integrated circuit panel ICP. For example, the controller 2, the data driver 3, and the line driver 4 may be included outside the integrated circuit panel ICP in the display apparatus DA.

The driving circuit array 1 may include a plurality of driving circuits PXIC. For example, the driving circuits PXIC may be arranged on a two-dimensional plane. Each of the driving circuits PXIC may provide a voltage or a signal to a corresponding pixel circuit in response to voltages or signals provided from the data driver 3 and the line driver 4. An embodiment in which a method in which the driving circuit array 1 provides a voltage or a signal to a corresponding pixel circuit is implemented will be described in detail with reference to FIG. 8.

For brief description, below, the description will be given as the driving circuits PXIC are arranged along a row direction and a column direction. However, the present disclosure is not limited thereto. The driving circuits PXIC may be two-dimensionally arranged in a zigzag shape, or the driving circuits PXIC may be three-dimensionally arranged.

In an embodiment, each of the driving circuits PXIC may be controlled in an active matrix manner. However, the present disclosure is not limited thereto. For example, the driving circuits PXIC may be controlled through various manners such as a passive matrix manner and a segment manner.

In an embodiment, each of the driving circuits PXIC may correspond to at least one of the pixel circuits included in the display panel DP of FIG. 1. Accordingly, the number of driving circuits PXIC may be determined based on the number of pixels included in the display panel DP.

The controller 2 may control the data driver 3 and/or the line driver 4 to provide voltages or signals to the driving circuits PXIC.

The data driver 3 may be connected to the driving circuit array 1 through a plurality of data lines DL. The data driver 3 may control the driving circuits PXIC by providing input data signals through the data lines DL in response to a control signal of the controller 2.

The data lines DL may be connected to the driving circuits PXIC. For example, each of the data lines DL may be connected to driving circuits PXIC of the driving circuit array 1, which are located at a same column. In this case, the driving circuits PXIC of the driving circuit array 1 located at the same column may be connected to the data driver 3 through a same data line DL, and may receive a same input data signal.

In an embodiment, an input data signal that each of the data lines DL transfers to the driving circuits PXIC may be used for each driving circuit PXIC to generate a signal to be transmitted to a corresponding pixel circuit. A method in which the driving circuit PXIC provides a signal to the pixel circuit based on the input data signal received from the data line DL will be described in detail with reference to FIG. 8.

The line driver 4 may be connected to the driving circuit array 1 through a plurality of clock lines CL. The line driver 4 may control the driving circuits PXIC by providing clock signals through the clock lines CL in response to a control signal of the controller 2.

The clock lines CL may be connected to the driving circuits PXIC. For example, each of the clock lines CL may be connected to driving circuits PXIC of the driving circuit array 1, which are located at a same row. In this case, the driving circuits PXIC of the driving circuit array 1 located at the same row may be connected to the line driver 4 through a same clock line CL, and may receive a same clock signal.

In an embodiment, a clock signal that each of the clock lines CL transfers to the driving circuits PXIC may be used to designate a driving circuit PXIC that will receive an input data signal through a data line DL. For example, driving circuits PXIC of the driving circuit array 1, which constitute a same column, may receive a same input data signal from the data driver 3, but only a driving circuit PXIC that receives the clock signal may operate in response to the input data signal. That is, when the driving circuit PXIC receives the input data signal through the data line DL, and further receives the clock signal through the clock line CL, the driving circuit PXIC may store the input data signal received through the data line DL.

In an embodiment, the line driver 4 may select driving circuits PXIC, which will operate in response to an input data signal, through the clock lines CL sequentially or non-sequentially in units of rows. For example, the line driver 4 may allow an arbitrary driving circuit row to operate in response to an input data signal, regardless of a physical location of each driving circuit row, through the clock lines CL.

In an embodiment, the data driver 3, the data lines DL, the line driver 4, and the clock line CL may be used to determine a fault of the corresponding driving circuit PXIC.

Figure 3:
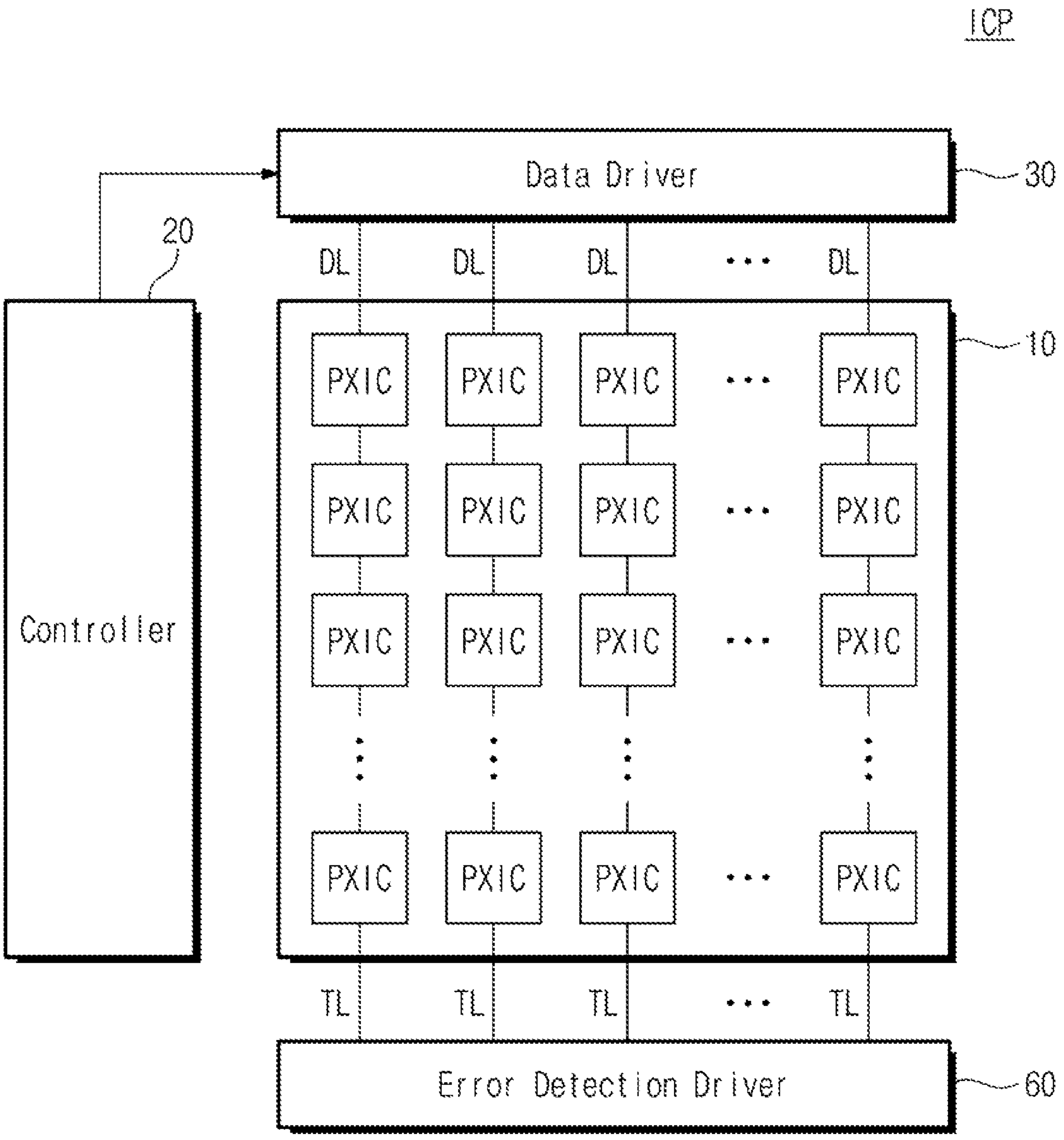
FIG. 3 is a block diagram illustrating an integrated circuit panel testing a driving circuit array of FIG. 2 in units of columns, according to an embodiment.

FIG. 3 is a block diagram illustrating an integrated circuit panel testing a driving circuit array of FIG. 2 in units of columns, according to an embodiment. Referring to FIGS. 2 and 3, the integrated circuit panel ICP may include a driving circuit array 10, a controller 20, a data driver 30, and an error detection driver 60. To describe a fault detecting method more briefly, the line driver 4 and the clock lines CL of FIG. 2 are not illustrated in FIG. 3, but the integrated circuit panel ICP may further include a line driver and clock lines. For example, each of the driving circuits PXIC may receive and operate a clock signal through a clock line from the line driver 4.

Configurations and functions of the driving circuit array 10, the controller 20, and the data driver 30 are similar to those described with reference to FIG. 2, and thus, duplicate descriptions will be omitted to avoid redundancy.

In the driving circuit array 10, driving circuits PXIC located at a same column may be connected in series. For example, the driving circuits PXIC located at the same column may constitute a driving circuit column.

A driving circuit column may receive an input data signal from the data driver 30, and may continuously transfer the input data signal such that an output data signal based on the input signal is provided to the error detection driver 60. A configuration of the driving circuit PXIC and a connection relationship of a driving circuit column will be described in detail with reference to FIG. 4.

The input data signal may be sequentially transferred to other driving circuits PXIC along the driving circuit column. For example, a driving circuit PXIC (e.g., a first driving circuit) directly receiving an input data signal from the data driver 30 through a data line DL may provide an output data signal based on the input signal to another driving circuit PXIC (e.g., a second driving circuit) of a same driving circuit column. A driving circuit PXIC (e.g., a (k+1)-th driving circuit) receiving an output data signal from another driving circuit PXIC (e.g., a k-th driving circuit) may provide its output data signal to a successive, next driving circuit PXIC (e.g., a (k+2)-th driving circuit), based on the received output data signal. The last driving circuit (e.g., an n-th driving circuit) of the driving circuit column may provide an output data signal to the error detection driver 60 through a test line TL, based on an output data signal provided from a previous driving circuit PXIC (e.g., an (n−1)-th driving circuit).

In an embodiment, when a fault does not occur in a driving circuit column, a period or a waveform of an output data signal that the last driving circuit PXIC (e.g., the n-th driving circuit) of the driving circuit column provides to the error detection driver 60 may be identical or similar to that of an input data signal that the data driver 30 provides to the driving circuit array 10.

In an embodiment, when a driving circuit in which a fault occurs is included in the driving circuit column, a period or a waveform of a signal that the last driving circuit PXIC (e.g., the n-th driving circuit) of the driving circuit column outputs may not be identical or similar to that of the input data signal that the data driver 30 provides to the driving circuit array 10.

In an embodiment, the data driver 30 may further transmit, to the error detection driver 60, the input data signal transmitted to the driving circuit array 10.

The error detection driver 60 may be connected to the driving circuit array 10 through a plurality of test lines TL. The error detection driver 60 may receive output data signals from the driving circuit columns through the test lines TL, respectively, and may determine whether a fault occurs in the driving circuit array 10.

In an embodiment, the error detection driver 60 may directly receive an input data signal from the data driver 30. In this case, the error detection driver 60 may determine whether a fault occurs in a driving circuit column, by comparing an output data signal transferred from a driving circuit column, based on the input signal, through a test line TL with the same input data signal directly received from the data driver 30, or received from the data driver not by way of the driving circuit column. For example, when a fault occurs in an arbitrary driving circuit included in a driving circuit column, an output data signal transferred through a test line TL and an input data signal directly received from the data driver 30 may be different. In this case, the error detection driver 60 may determine that a fault occurs in at least one of the driving circuits PXIC of a driving circuit column corresponding to the test line TL and outputting the output data signal different from the input data signal.

In an embodiment, a function of the data driver 30 may be identical or similar to the function of the data driver 3 of FIG. 2. For example, in the case of testing a fault of a display apparatus, an input data signal that the data driver 30 transmits to the driving circuit array 10 may be a signal identical or similar to a signal provided when an operation of the display apparatus is performed.

Figure 4:
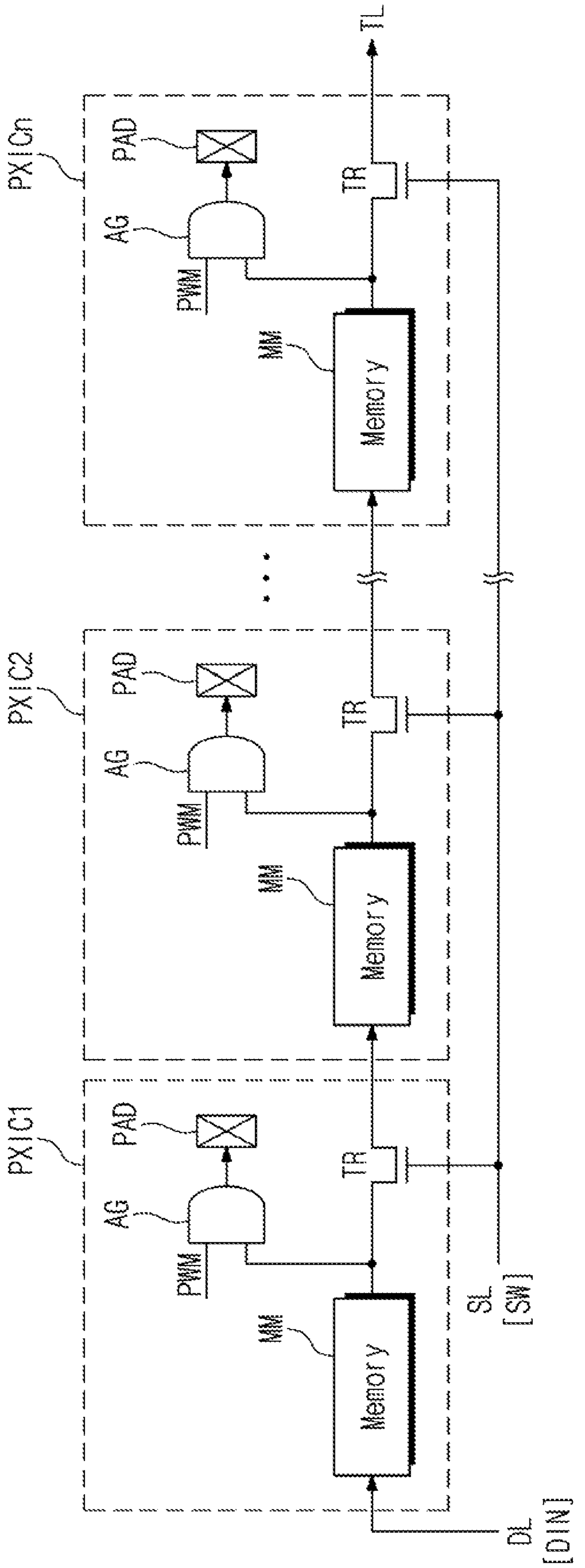
FIG. 4 is a circuit diagram illustrating a configuration of a driving circuit of FIG. 3, according to an embodiment.

FIG. 4 is a circuit diagram illustrating a configuration of a driving circuit of FIG. 3, according to an embodiment. Below, a configuration and a connection relationship of the driving circuit PXIC will be described with reference to FIGS. 3 and 4, but the present disclosure is not limited thereto.

Referring to FIGS. 3 and 4, each of a plurality of driving circuits PXIC1 to PXICn may include a memory MM, a transistor TR, an AND gate AG, and a data pad PAD.

Each of the driving circuits PXIC1 to PXICn may receive an input data signal. Each of the driving circuits PXIC1 to PXICn may provide a driving voltage or a driving signal to a corresponding pixel circuit (not illustrated) through the data pad PAD. The driving circuits PXIC1 to PXICn may be connected in series in response to a switching signal SW to be described later.

In an embodiment, each of second to n-th driving circuits driving circuits PXIC2 to PXICn, other than the first driving circuit PXIC1 directly receiving an input data signal through a data line DL, may receive an output data signal of a prior driving circuit PXIC connected thereto as its input data signal, instead of directly receiving the input data signal through the data line DL. In this case, each of the second to n-th driving circuits PXIC2 to PXICn may not receive an input data signal DIN from the data line DL.

The memory MM may receive an input data signal and may store the received input data signal. For example, the memory MM of the first driving circuit PXIC1 may receive the input data signal DIN from the data driver 30 through the data line DL, and the memory MM of the second to n-th driving circuits PXIC2 to PXICn may receive an input data signal from a prior driving circuit (e.g., an output signal of a prior driving circuit of a same driving circuit column). The memory MM may determine whether to store the received input data signal, under control of the controller 20 (e.g., depending on a control through the line driver 4 of FIG. 2.). A signal or data stored in the memory MM may be transferred to the AND gate AG and/or the transistor TR.

In an embodiment, the memory MM may receive a clock signal through a clock line. The memory MM may store an input data signal received from the data line DL or a prior driving circuit in response to the received clock signal. For example, when a fault detecting operation is performed, each of the driving circuits PXIC1 to PXICn may receive a clock signal from a clock line. However, for brief description, a clock signal input through a clock line is not illustrated in FIG. 4.

The AND gate AG may perform an AND operation on the signal stored in the memory MM and a pulse width modulation (PWM) signal. A first input terminal of the AND gate AG may receive the PWM signal, and a second input terminal thereof may receive a signal output from the memory MM. When two input signals are high-level signals, the AND gate AG may output a high-level signal through an output terminal thereof.

In an embodiment, the PWM signal may be provided directly or indirectly to the AND gate AG from the controller 20. For example, the PWM signal may be directly generated by the controller 20, and may then be provided to the first input terminal of the AND gate AG. Alternatively, a separate driver may generate the PWM signal in response to a control signal of the controller 20, and the PWM signal thus generated may be provided to the first input terminal of the AND gate AG.

In an embodiment, the PWM signal may be a signal that is obtained by adjusting a duty cycle of a pulse, which has iterative high-to-low and low-to-high transitions, to adjust brightness of a light-emitting element of a pixel circuit corresponding to the driving circuit PXIC.

The data pad PAD may receive a signal from the AND gate AG, and may output a voltage or a signal to a pixel circuit. For example, the data pad PAD may be connected to at least one of the pixel circuits constituting the display panel DP of FIG. 1. In this case, the brightness of the pixel circuit of the display panel DP and whether to turn on or off the pixel circuit may be controlled depending on a signal input to the data pad PAD. How to connect the display panel DP and the integrated circuit panel ICP through the data pad PAD and how to transfer a signal through the data pad PAD will be described in detail with reference to FIG. 8.

The transistor TR may perform a switch function of controlling whether to transfer a signal output from the memory MM to a next driving circuit PXIC or to the error detection driver 60. For example, a gate terminal of the transistor TR may receive a switching signal SW through a switch line SL. Depending on whether to receive the switching signal SW, the transistor TR may transfer or may not transfer a signal output from the memory MM to the next driving circuit PXIC or the error detection driver 60.

In an embodiment, the switching signal SW may be provided from the outside of the driving circuit PXIC. For example, the switching signal SW may be directly or indirectly provided from the controller 20 or may be provided from a switch driver (not illustrated).

In an embodiment, the switching signal SW may be differently provided for each of a plurality of driving circuit rows of the driving circuit array 10. For example, driving circuits PXIC constituting one driving circuit row may be provided with a same switching signal SW. In this case, an input data signal provided to the first driving circuit PXIC1 through the data line may be continuously transferred such that the input data signal is provided to the error detection driver 60 from the n-th driving circuit PXICn through the test line TL. The error detection driver 60 may determine whether any driving circuit PXIC in which a fault occurs is present in the column of the driving circuits PXIC1 to PXICn, based on the output data signal provided from the n-th driving circuit PXICn.

In an embodiment, according to the fault detecting method described with reference to FIGS. 3 and 4, fault detection is possible for each column of the driving circuit array 10. However, in this case, the error detection driver 60 may determine a driving circuit column in which a fault occurs, but may not specify a driving circuit in which the fault occurs.

Figure 5:
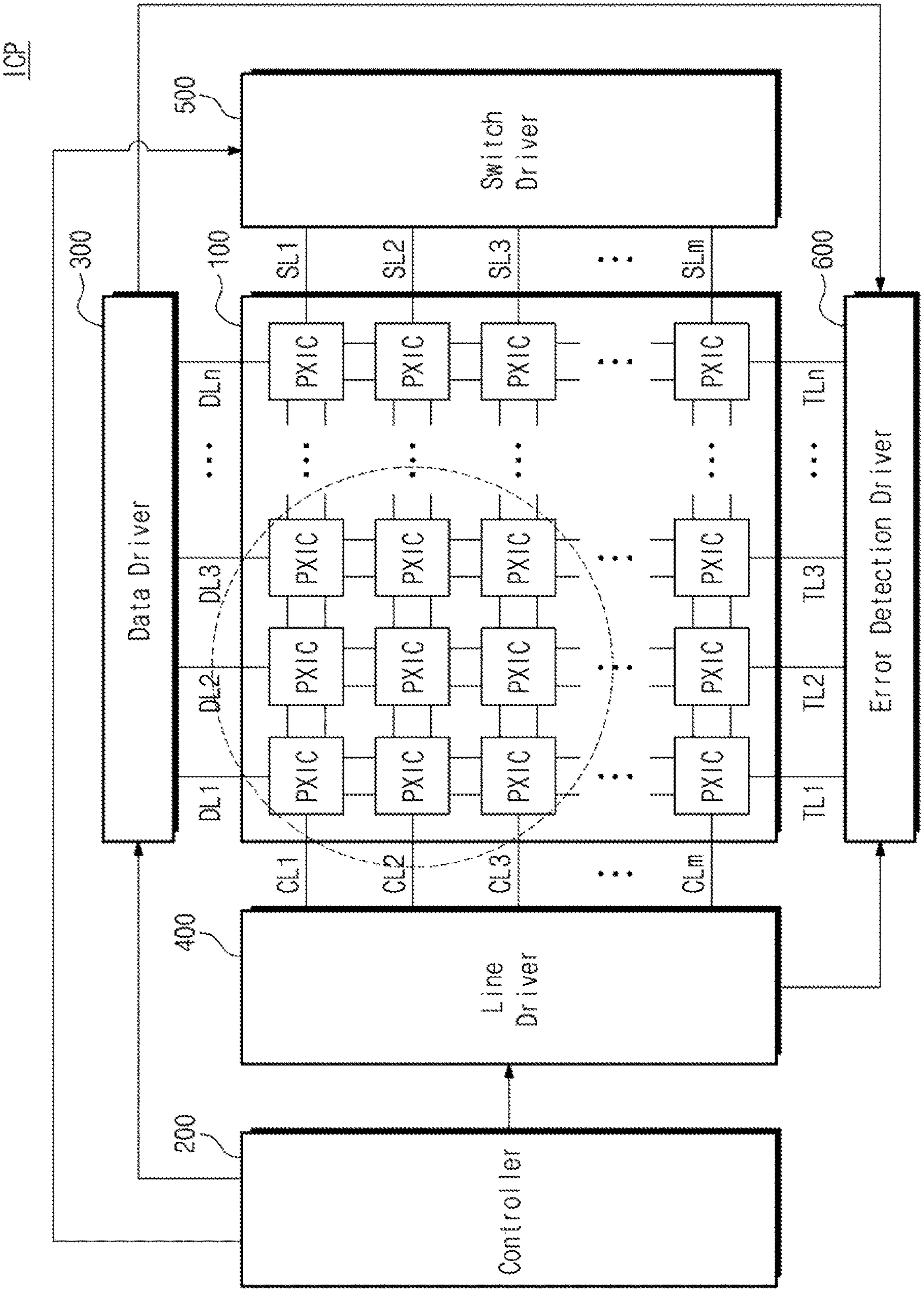
FIG. 5 is a block diagram illustrating a structure of an integrated circuit panel, according to an embodiment.

FIG. 5 is a block diagram illustrating a structure of an integrated circuit panel, according to an embodiment. Referring to FIG. 5, the integrated circuit panel ICP may include a driving circuit array 100, a controller 200, a data driver 300, a line driver 400, a switch driver 500, and an error detection driver 600.

The driving circuit array 100 may include a plurality of driving circuits PXIC. The driving circuits PXIC may be arranged on a two-dimensional plane to form the driving circuit array 100. For example, the driving circuits PXIC may be arranged in an n by m structure. Each of the driving circuits PXIC may provide a voltage or a signal to a corresponding pixel circuit in response to voltages or signals provided from the data driver 300 and the line driver 400.

Functions and operations of the controller 200, the data driver 300, and the line driver 400 are similar to those described with reference to FIG. 2, and thus, duplicate descriptions will be omitted to avoid redundancy.

The data driver 300 may be connected to first to n-th driving circuit columns of the driving circuit array 100 through first to n-th data lines DL1 to DLn, respectively. For example, in the case of a second driving circuit column, the data driver 300 may be connected to driving circuits PXIC included in the second driving circuit column through a second data line DL2. In this case, the driving circuits PXIC of the driving circuit array 100 located at the second driving circuit column may receive a same input data signal through the second data line DL2.

In an embodiment, input data signals that the data driver 300 provides to the driving circuits PXIC through the data lines DL1 to DLn respectively may be different from each other.

In an embodiment, an input data signal that the data driver 300 provides to the driving circuit array 100 may be a signal for selecting some driving circuits PXIC of the driving circuit array 100. For example, in the case of operating a pixel circuit or in the case of detecting a fault of a driving circuit PXIC, the input data signal may be a signal for selecting some of the driving circuits PXIC. That is, in the case of operating the pixel circuit, the input data signal may be a signal for selecting a driving circuit PXIC corresponding to a pixel circuit targeted for display, and in the case of detecting a fault of the driving circuit PXIC, the input data signal may be a signal for selecting a driving circuit PXIC to be tested for determining whether a fault occurs.

The line driver 400 may be connected to first to m-th driving circuit rows of the driving circuit array 100 through first to m-th clock lines CL1 to CLm, respectively. For example, in the case of a second driving circuit row, the line driver 400 may be connected to driving circuits PXIC included in the second driving circuit row through the second clock line CL2. In this case, the driving circuits PXIC of the driving circuit array 100 located at the second driving circuit row may receive a same clock signal through the second clock line CL2.

In an embodiment, in the case where the line driver 400 does not provide a clock signal to an arbitrary driving circuit row, the line driver 400 may transmit a signal of clock-gating the clock signal. In this case, the clock-gating signal may be a signal that does not toggle or may be a signal that maintains a low level.

In an embodiment, clock signals that the line driver 400 provides to the clock lines CL1 to CLm, respectively, may be identical to or different from each other. For example, the line driver 400 may provide the clock signals to the clock lines CL1 to CLm in different time periods, respectively.

In an embodiment, a driving circuit PXIC may selectively store an input data signal that the data driver 300 provides. For example, when a clock signal is received from the line driver 400 through a clock line CL, a driving circuit PXIC may store an input data signal provided from the data driver 300. When a clock signal is not received from the line driver 400, the driving circuit PXIC may not store the input data signal provided from the data driver 300. A method in which the driving circuit PXIC selectively stores data will be described in detail with reference to FIG. 7.

A switch driver 500 may receive a control signal from the controller 200. In response to the received control signal, the switch driver 500 may determine whether to output an input data signal received by each of the driving circuits PXIC to a next driving circuit PXIC in a same driving circuit column or the error detection driver 600. The switch driver 500 may be connected to the first to m-th driving circuit rows of the driving circuit array 100 through first to m-th switch lines SL1 to SLm. For example, in the case of the second driving circuit row, the switch driver 500 may be connected to the driving circuits PXIC included in the second driving circuit row through the second switch line SL2. In this case, the driving circuits PXIC of the driving circuit array 100 located at the second driving circuit row may receive a same switching signal through the second switch line SL2.

In an embodiment, a switching signal may enable a fault detecting operation of a driving circuit row. For example, the switching signal may allow each of driving circuits PXIC of a corresponding driving circuit row to transmit an output data signal to a next driving circuit PXIC in a same driving circuit column or the error detection driver 600. In this case, the output data signal may be a signal output through a corresponding driving circuit PXIC based on an input data signal.

In an embodiment, the switch driver 500 may provide switching signals to the driving circuits PXIC through the switch lines SL1 to SLm at different time periods, respectively. In this case, an operation of detecting a fault of a driving circuit row may be performed in a different time period for each row. A method of detecting a fault of each driving circuit PXIC through a switching signal will be described in detail with reference to FIGS. 6 and 7.

The error detection driver 600 may be connected to the driving circuit array 100 through a plurality of test lines TL1 to TLn. The error detection driver 600 may be connected to the first to n-th driving circuit columns of the driving circuit array 100 through the first to n-th test lines TL1 to TLn. For example, in the case of the second driving circuit column, the error detection driver 600 may be connected to the driving circuits PXIC included in the second driving circuit column through the second test line TL2. In this case, the error detection driver 600 may determine whether a fault occurs in each of the driving circuits PXIC, based on output data signals received from the driving circuits PXIC.

In an embodiment, the error detection driver 600 may further receive an input data signal and a clock signal from the data driver 300 and the line driver 400, respectively. For example, the input data signal and the clock signal that the error detection driver 600 directly receives from the data driver 300 and the line driver 400, respectively, may be signals that the data driver 300 and the line driver 400 output to the driving circuit array 100 or may be signals including information about the signals output from the data driver 300 and the line driver 400. The error detection driver 600 may compare the received input data signal and clock signal with output data signals received through the test lines TL1 to TLn. In this case, the error detection driver 600 may determine whether a fault occurs in any driving circuit PXIC, based on the input data signal and the clock signal.

In an embodiment, a fault determining operation may be performed for each of the rows of the driving circuits PXIC included in the driving circuit array 100. For example, when a switching signal for requesting to output an output data signal of a first driving circuit row is provided through the first switch line SL1, a switching signal that is transmitted to the driving circuit array 100 through each of the second to m-th switch lines SL2 to SLm may be a signal for requesting to block an output data signal of a corresponding driving circuit. In this case, whether driving circuits PXIC included in the first driving circuit row of the driving circuit array 100 are faulty may be determined.

In an embodiment, a fault determining operation may be performed for each of rows of the driving circuits PXIC included in the driving circuit array 100. For example, in response to a switching signal received through the first switch line SL1, the driving circuits PXIC of the first driving circuit row may respectively provide output data signals to the error detection driver 600 through the driving circuits PXIC of the next driving circuit rows and/or the test lines TL1 to TLn. In this case, the error detection driver 600 may determine whether a fault occurs in any driving circuit column, based on output data signals received from the test lines TL1 to TLn.

In an embodiment, a fault determining operation may be performed on one driving circuit row (e.g., a first driving circuit row), and another fault determining operation may then be performed on another driving circuit row. Accordingly, when an output data signal is provided from the driving circuit array 100 to the error detection driver 600, the error detection driver 600 may determine whether the output data signal is output from any driving circuit PXIC. For example, the error detection driver 600 may determine whether an output data signal received from a driving circuit PXIC is present in any driving circuit column of the driving circuit array 100, through the first to n-th test lines TL1 to TLn physically separated from each other. Because the driving circuit rows of the driving circuit array 100 receive switching signals, which are distinguished from each other in time series, through the first to m-th switch lines SL1 to SLm, the error detection driver 600 may determine whether an output data signal is output from any driving circuit row of the driving circuit array 100. Accordingly, according to an embodiment, an integrated circuit panel capable of determining a fault of each of a plurality of driving circuits and an operation method thereof may be provided.

Figure 6:
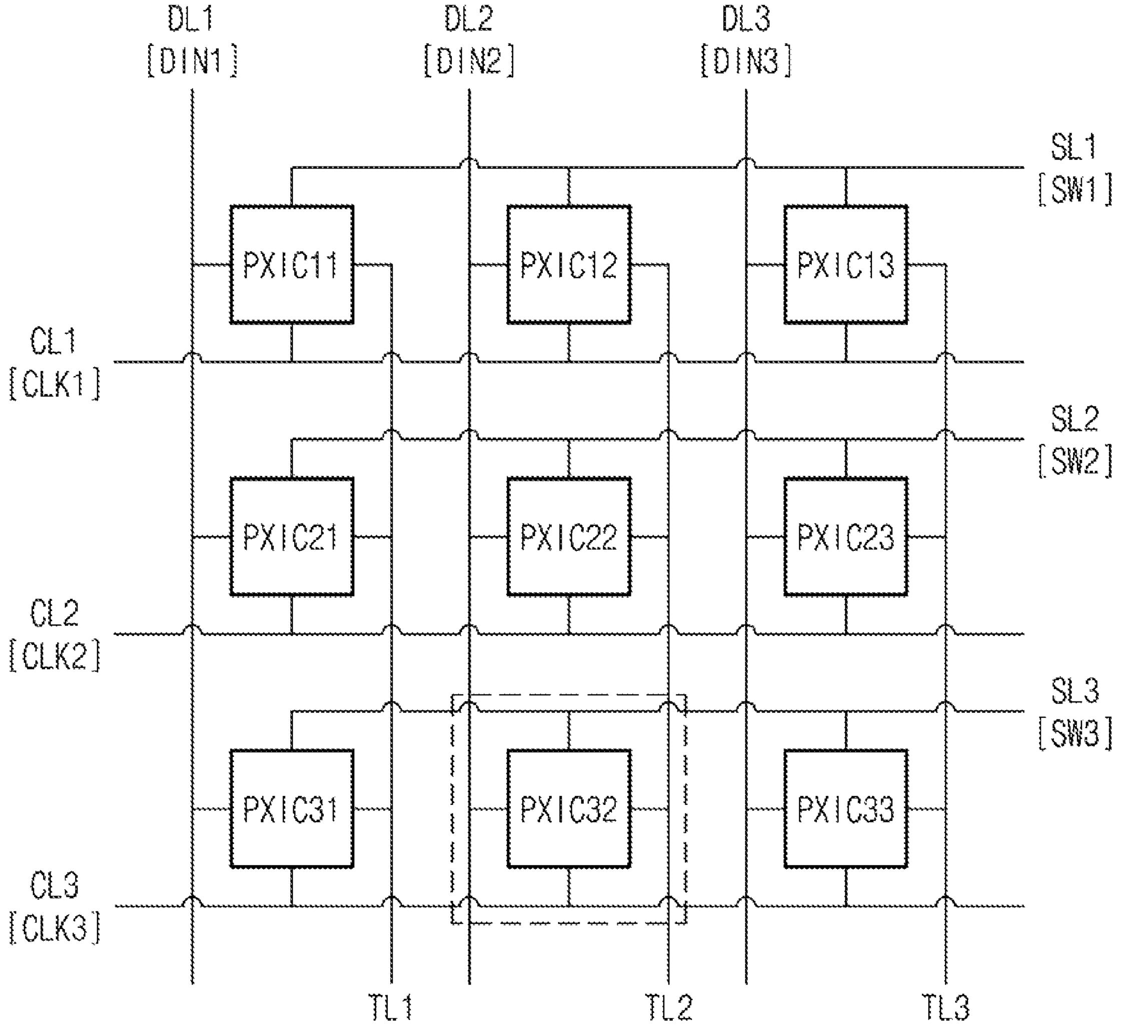
FIG. 6 is a block diagram illustrating a dotted portion of a driving circuit array of FIG. 5 in detail, according to an embodiment.

FIG. 6 is a diagram illustrating a partial configuration of a driving circuit array of FIG. 5 in detail, according to an embodiment. Referring to FIGS. 5 and 6, the driving circuit array 100 may include a plurality of driving circuits PXIC11 to PXIC33.

Each of the driving circuits PXIC11 to PXIC33 may receive an input data signal DIN from the data driver 300 through a data line DL, may receive a clock signal CLK from the line driver 400 through a clock line CL, and may receive a switching signal SW from the switch driver 500 through a switch line SL. Each of the driving circuits PXIC11 to PXIC33 may provide a driving signal to a corresponding pixel circuit based on an input data signal and a clock signal, and may provide an output data signal to the error detection driver 600 through a next driving circuit PXIC and/or a test line TL when a switching signal is further received.

The first to third data lines DL1 to DL3 may be connected to the driving circuits PXIC11 to PXIC33. For example, the first data line DL1 may be connected to the driving circuits PXIC11, PXIC21, and PXIC31, the second data line DL2 may be connected to the driving circuits PXIC12, PXIC22, and PXIC32, and the third data line DL3 may be connected to the driving circuits PXIC13, PXIC23, and PXIC33. A first input data signal DIN1 may be provided to the driving circuits PXIC11 to PXIC31 through the first data line DL1, a second input data signal DIN2 may be provided to the driving circuits PXIC12 to PXIC32 through the second data line DL2, and a third input data signal DIN3 may be provided to the driving circuits PXIC13 to PXIC33 through the third data line DL3.

The first to third clock lines CL1 to CL3 may be connected to the driving circuits PXIC11 to PXIC33. For example, the first clock line CL1 may be connected to the driving circuits PXIC11, PXIC12, and PXIC13, the second clock line CL2 may be connected to the driving circuits PXIC21, PXIC22, and PXIC23, and the third clock line CL3 may be connected to the driving circuits PXIC31, PXIC32, and PXIC33. A first clock signal CLK1 may be provided to the driving circuits PXIC11 to PXIC13 through the first clock line CL1, a second clock signal CLK2 may be provided to the driving circuits PXIC21 to PXIC23 through the second clock line CL2, and a third clock signal CLK3 may be provided to the driving circuits PXIC31 to PXIC33 through the third clock line CL3.

The first to third switch lines SL1 to SL3 may be connected to the driving circuits PXIC11 to PXIC33. For example, the first switch line SL1 may be connected to the driving circuits PXIC11, PXIC12, and PXIC13, the second switch line SL2 may be connected to the driving circuits PXIC21, PXIC22, and PXIC23, and the third switch line SL3 may be connected to the driving circuits PXIC31, PXIC32, and PXIC33. A first switching signal SW1 may be provided to the driving circuits PXIC11 to PXIC13 through the first switch line SL1, a second switching signal SW2 may be provided to the driving circuits PXIC21 to PXIC23 through the second switch line SL2, and a third switching signal SW3 may be provided to the driving circuits PXIC31 to PXIC33 through the third switch line SL3.

The first to third test lines TL1 to TL3 may be connected to the driving circuits PXIC11 to PXIC33. For example, the first test line TL1 may be connected to the driving circuits PXIC11, PXIC21, and PXIC31, the second test line TL2 may be connected to the driving circuits PXIC12, PXIC22, and PXIC32, and the third test line TL3 may be connected to the driving circuits PXIC13, PXIC23, and PXIC33. The error detection driver 600 may receive output data signals from the driving circuits PXIC11 to PXIC33 through the first to third test lines TL1 to TL3.

For better understanding, below, an operation and a connection relationship of a driving circuit PXIC32 at the third driving circuit row and the second driving circuit column of the driving circuit array 100 will be described as a representative example. However, the present disclosure is not limited thereto. For example, the remaining driving circuits PXIC of the driving circuit array 100 may also perform operations and functions that are identical or similar to an operation and a function of the driving circuit PXIC32 to be described below.

Referring to FIGS. 5 and 6, the driving circuit PXIC32 may receive the second input data signal DIN2 through the second data line DL2, and may receive the third clock signal CLK3 through the third clock line CL3. The driving circuit PXIC32 may store the second input data signal DIN2 in response to the third clock signal CLK3, and may supply a driving signal or a driving voltage to a corresponding pixel circuit based on the second input data signal DIN2 stored therein. An operation of the driving circuit PXIC will be described in detail with reference to FIGS. 7 and 8.

The driving circuit PXIC32 may receive the third switching signal SW3 through the third switch line SL3. The driving circuit PXIC32 may transmit an output data signal to the error detection driver 600 through the third test lines TL3 in response to the third switching signal SW3. The output data signal from the driving circuit PXIC32 may be used to determine whether a fault occurs in the driving circuit PXIC32. For example, when a fault occurs in the driving circuit PXIC32, the error detection driver 600 may fail to receive an output data signal corresponding to the driving circuit PXIC32 or may receive an output data signal not corresponding to the input data signal. An output data signal that corresponds to the case where a fault occurs in the driving circuit PXIC32 will be described in detail with reference to FIGS. 13 and 14.

Figure 7:
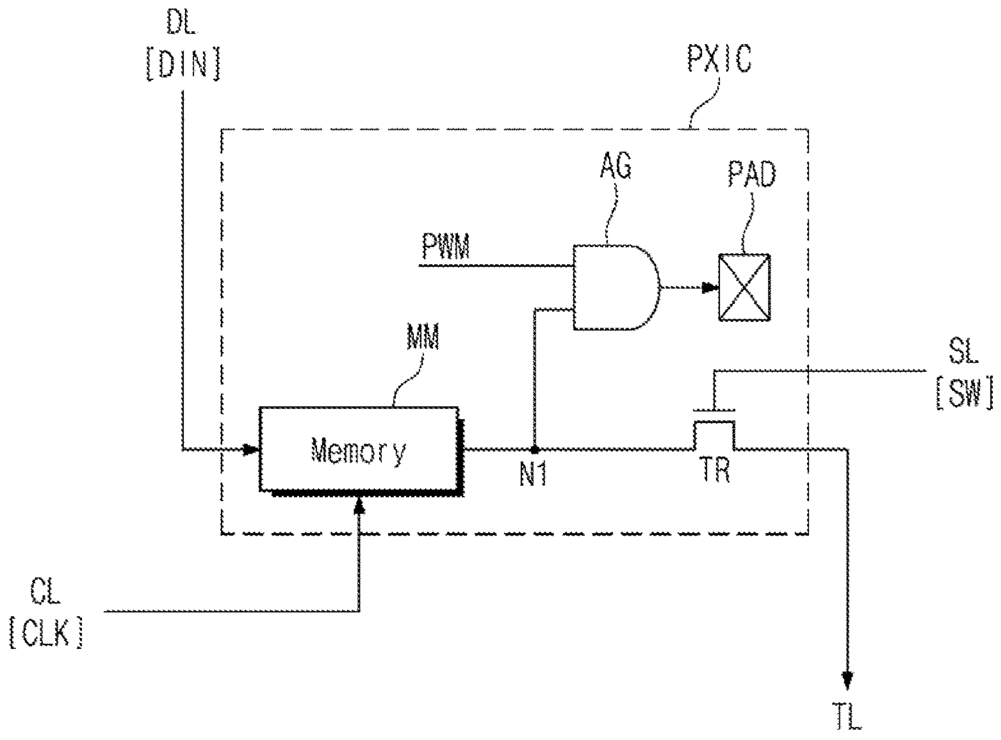
FIG. 7 is a circuit diagram illustrating an embodiment in which a driving circuit of FIG. 5 is implemented, according to an embodiment.

FIG. 7 is a block circuit diagram illustrating an embodiment in which a driving circuit of FIG. 5 is implemented as an example. Referring to FIGS. 5 and 7, the driving circuit PXIC may include the memory MM, the AND gate AG, the data pad PAD, and the transistor TR.

For brief description, the detailed description associated with the functions and the connection relationship of the memory MM, the AND gate AG, the data pad PAD, and the transistor TR described with reference to FIG. 4 are omitted.

The memory MM may receive an input data signal DIN through a data line DL, and may store the input data signal DIN in response to a clock signal CLK received through a clock line CL. For example, the memory MM may store the input data signal DIN when the clock signal CLK is provided, and may not store the input data signal DIN when the clock signal CLK is not provided.

The memory MM may transfer the stored input data signal DIN to the AND gate AG through a first node N1 and/or may transfer the stored input data signal DIN to the gate terminal of the transistor TR through the first node N1.

In an embodiment, the memory MM may be implemented with a shift register including a multiplexer, a transistor, an inverter, and/or a combination of like elements. The memory MM implemented with the shift register will be described with reference to FIG. 12.

For example, the memory MM may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM). However, the present disclosure is not limited thereto. For example, the driving circuit PXIC may be implemented to include a memory including various elements capable of temporarily storing an input signal or a combination thereof.

In an embodiment, an operation of transmitting an input data signal DIN stored in the memory MM to the error detection driver 600 through a test line TL may be performed regardless of whether an operation of providing a driving signal to a pixel circuit through the data pad PAD is being performed. For example, an operation in which a driving circuit PXIC provides a stored input data signal DIN to a drain terminal of the transistor TR through the first node N1 may be performed regardless of whether an operation, in which the driving circuit PXIC provides the stored input data signal DIN to the AND gate AG through the first node N1, is being performed. In this case, an integrated circuit panel capable of testing a fault of a driving circuit even in an operation of a display apparatus may be provided. That is, according to an embodiment, an integrated circuit panel that performs an operation of detecting a fault of a driving circuit independently of driving a pixel circuit may be provided.

The first node N1 may be connected to the memory MM, the first input terminal of the AND gate AG, and the drain terminal of the transistor TR. That is, a same signal may be provided to a pixel circuit and the error detection driver 600 through the first node N1.

A gate terminal of the transistor TR may be connected to a switch line SL, the drain terminal thereof may be connected to the first node N1, and a source terminal thereof may be connected to the test line TL. The gate terminal of the transistor TR may receive a switching signal SW through the switch line SL. The transistor TR may transfer a signal received from the first node N1 to the error detection driver 600 through the test line TL in response to the received switching signal SW. In this case, the signal that is transferred to the error detection driver 600 through the test line TL may be an output data signal.

In an embodiment, when a fault detection of the driving circuit PXIC is not performed, the transistor TR may be in a turn-off state. In this case, an output data signal may not be transferred to the error detection driver 600.

Figure 8:
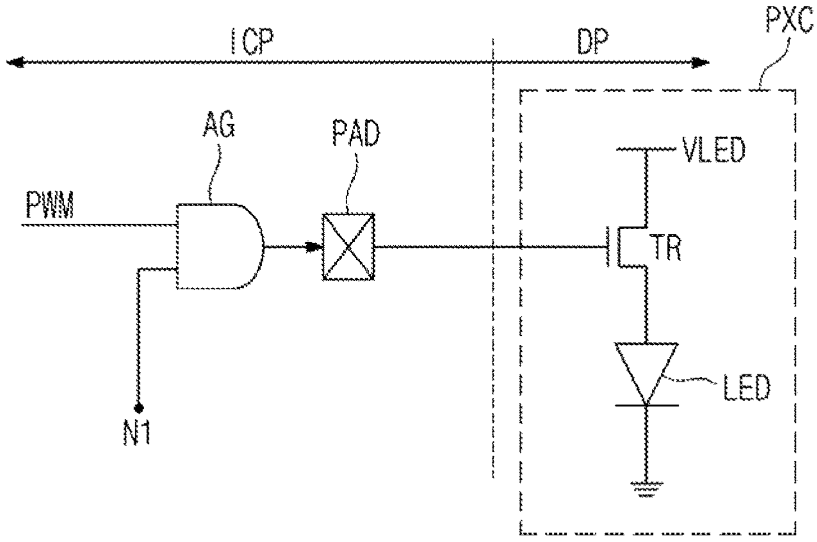
FIG. 8 illustrates a connection relationship of an integrated circuit panel and a display panel of FIG. 1, according to an embodiment.

FIG. 8 illustrates a connection relationship of an integrated circuit panel and a display panel of FIG. 1, according to an embodiment. For brief description, a partial configuration of one driving circuit PXIC and one pixel circuit PXC are illustrated in FIG. 8. Referring to FIGS. 1, 7, and 8, the integrated circuit panel ICP and the display panel DP may be connected through a data pad PAD of a driving circuit PXIC. For example, the driving circuit PXIC of the integrated circuit panel ICP may provide a driving signal to the data pad PAD, and the pixel circuit PXC may receive the driving signal from the data pad PAD.

The pixel circuit PXC may include a transistor TR and a light-emitting element LED. A gate terminal of the transistor TR of the pixel circuit PXC may be connected to the data pad PAD, and a drain terminal thereof may be supplied with a bias voltage VLED. When the driving voltage or the driving signal is provided from the data pad PAD, the transistor TR may function as a current source.

A source terminal of the transistor TR may be connected to the light-emitting element LED. For example, the light-emitting element LED may include a light-emitting diode (LED), a micro LED, a laser diode, and/or anything similar thereto. In the present disclosure, the description will be given under the assumption that the light-emitting element LED is the micro LED.

When a driving voltage or a driving signal is input to the pixel circuit PXC from the data pad PAD, a current may be supplied to the light-emitting element LED. In an embodiment, brightness of the light-emitting element LED may be adjusted depending on an on-off ratio of the driving voltage or driving signal that is supplied from the data pad PAD to the pixel circuit PXC.

Figure 9:
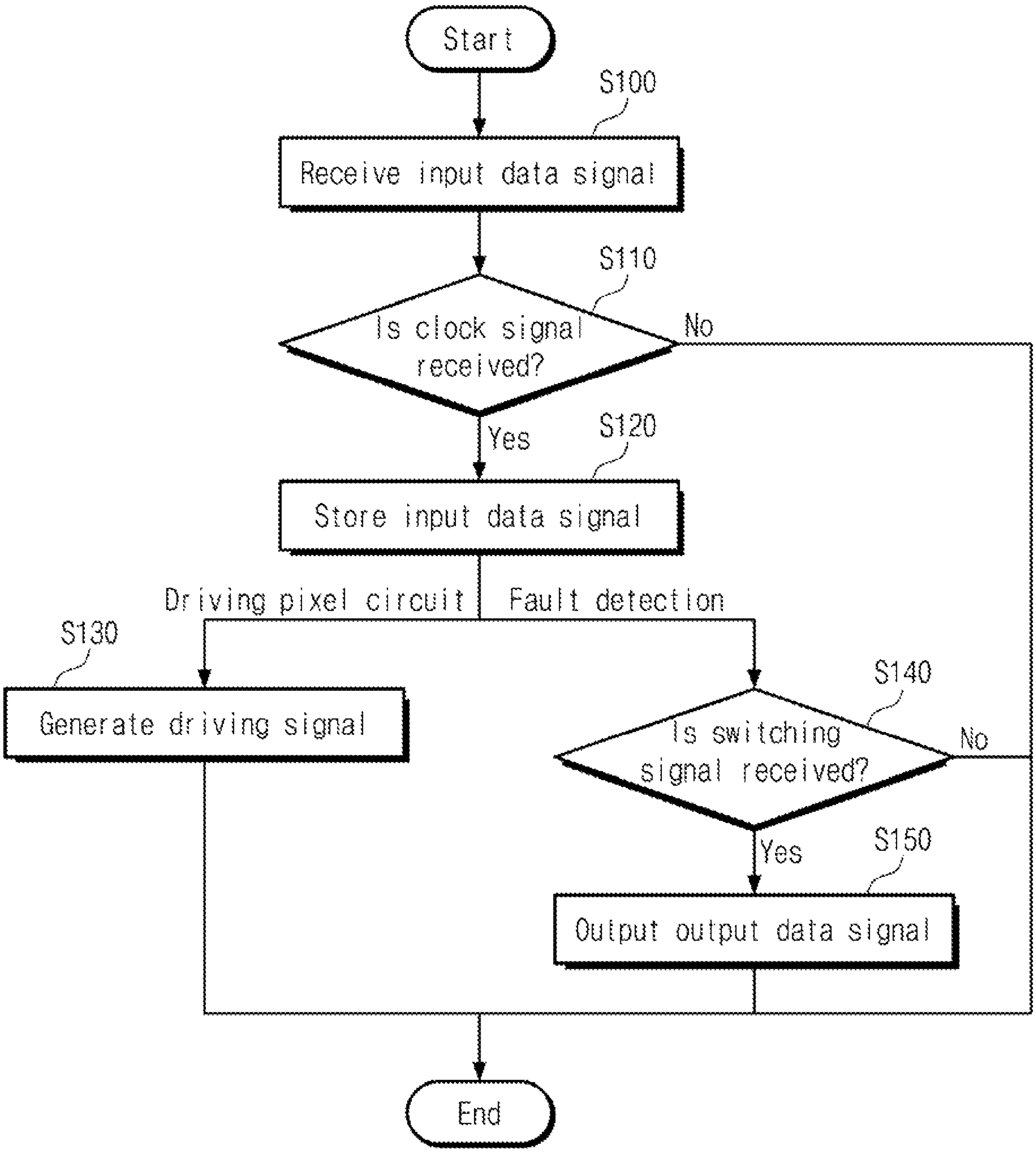
FIG. 9 is a flowchart illustrating an operation method of a driving circuit, according to an embodiment.

FIG. 9 is a flowchart illustrating an operation method of a driving circuit according to an embodiment. Referring to FIGS. 7 and 9, in operation S100, a driving circuit PXIC may receive an input data signal DIN. For example, the driving circuit PXIC may receive the input data signal DIN through a data line DL.

In operation S110, the driving circuit PXIC may operate in response to a clock signal CLK. For example, the driving circuit PXIC may operate in response to the clock signal CLK received through a clock line CL. The driving circuit PXIC may perform operation S120 when the clock signal CLK is received, and may not perform operation S120 when the clock signal CLK is not received. That is, the driving circuit PXIC may be in a dormant state when the clock signal CLK is not received.

In operation S120, the driving circuit PXIC may store the input data signal DIN. For example, the driving circuit PXIC may store the received input data signal DIN in response to the clock signal CLK. The driving circuit PXIC may use the stored input data signal DIN to generate a driving signal in operation S130 when the driving circuit PXIC drives a pixel circuit, and may use the stored input data signal DIN to generate an output data signal in operation S140 and operation S150 when an operation of detecting a fault of the driving circuit PXIC is performed.

When the driving circuit PXIC drives the pixel circuit, operation S130 may be performed. In operation S130, the driving circuit PXIC may generate the driving signal based on the stored input data signal DIN. For example, the driving circuit PXIC may generate the driving signal by performing an AND operation (conjunction) on the stored input data signal DIN and a PWM signal. The generated driving signal may be provided to the pixel circuit through a data pad PAD. The driving circuit PXIC outputting the driving signal may be in a dormant state until receiving any other signal.

When an operation of detecting a fault of the driving circuit PXIC is performed, operation S140 may be performed. In operation S140, the driving circuit PXIC may operate in response to a switching signal SW. For example, the driving circuit PXIC may operate in response to the switching signal SW received through a switch line SL. The driving circuit PXIC may perform operation S150 when the switching signal SW is received, and may not perform the fault detecting operation when the switching signal SW is not received.

In operation S150, the driving circuit PXIC may output an output data signal. For example, the driving circuit PXIC may output an output data signal, which is generated based on the stored input data signal DIN, through the test line TL.

In an embodiment, operation S130 may be performed independently of operation S140 and operation S150, and vice versa. For example, even while operation S130 is performed, operation S140 and operation S150 may be performed, and even though the switching signal SW is not received in operation S140, operation S130 may be performed.

Figure 10:
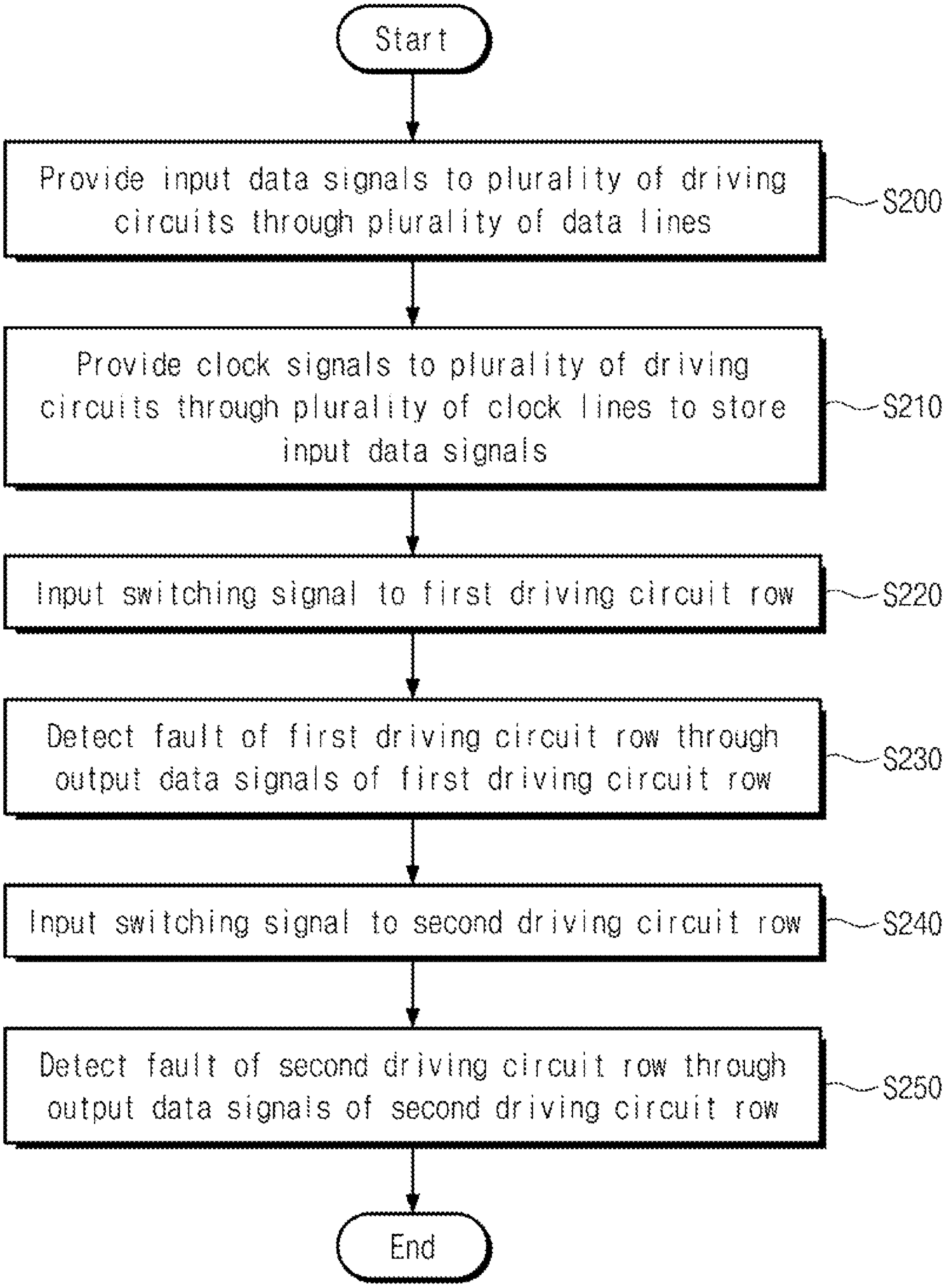
FIG. 10 is a flowchart illustrating an operation method of an integrated circuit panel, according to an embodiment.

FIG. 10 is a flowchart illustrating an operation method of an integrated circuit panel, according to an embodiment. For brief description, an operation method of the integrated circuit panel ICP, in which faults of the driving circuits PXIC11, PXIC12, PXIC21, and PXIC22 located at the first and second driving circuit rows and the first and second driving circuit columns from among the driving circuits PXIC11 to PXIC33 illustrated in FIG. 6 are detected, will be described with reference to FIG. 10, but the present disclosure is not limited thereto. Below, the operation method of the integrated circuit panel ICP, which is performed to detect faults of the driving circuits PXIC11, PXIC12, PXIC21, and PXIC22 will be described with reference to FIGS. 5, 6, and 10.

The operation method of the integrated circuit panel ICP, which is performed to detect faults of the driving circuits PXIC11, PXIC12, PXIC21, and PXIC22 may start from operation S200. In operation S200, the integrated circuit panel ICP may provide input data signals to a plurality of driving circuits PXIC through a plurality of data lines DL, respectively. For example, the integrated circuit panel ICP may provide the first input data signal DIN1 to the driving circuits PXIC11 and PXIC21 through the first data line DL1, and may provide the second input data signal DIN2 to the driving circuits PXIC12 and PXIC22 through the second data line DL2.

In operation S210, the integrated circuit panel ICP may provide clock signals to the driving circuits PXIC through a plurality of clock lines CL, respectively, so that the input data signals may be stored therein. For example, the integrated circuit panel ICP may provide the first clock signal CLK1 to the driving circuits PXIC11 and PXIC12 through the first clock line CL1, and may provide the second clock signal CLK2 to the driving circuits PXIC21 and PXIC22 through the second clock line CL2. Each of the driving circuits PXIC receiving a corresponding clock signal may store a corresponding input data signal.

In operation S220, the integrated circuit panel ICP may input a switching signal SW to the driving circuits PXIC11 and PXIC12 included in the first driving circuit row of the driving circuit array 100. For example, the integrated circuit panel ICP may input the first switching signal SW1 to the driving circuits PXIC11 and PXIC12 through the first switch line SL1.

In operation S230, the integrated circuit panel ICP may detect a fault of the first driving circuit row through output data signals output from the driving circuits PXIC11 and PXIC12 included in the first driving circuit row. For example, the integrated circuit panel ICP may receive an output data signal from the driving circuit PXIC11 through the first test line TL1, may compare the output data signal with the first input data signal DIN1 and the first clock signal CLK1 (e.g. a time period of the first clock signal provision), and may determine a fault of the driving circuit PXIC11. Also, the integrated circuit panel ICP may receive an output data signal from the driving circuit PXIC12 through the second test line TL2, may compare the output data signal with the second input data signal DIN2 and the first clock signal CLK1 (e.g. a time period of the first clock signal provision), and may determine a fault of the driving circuit PXIC12. Accordingly, the integrated circuit panel ICP may detect faults of the driving circuits PXIC11 and PXIC12 of the first driving circuit row.

In operation S240, the integrated circuit panel ICP may input a switching signal SW to the driving circuits PXIC21 and PXIC22 included in the second driving circuit row of the driving circuit array 100. For example, the integrated circuit panel ICP may input the second switching signal SW2 to the driving circuits PXIC21 and PXIC22 through the second switch line SL2.

In operation S240, the integrated circuit panel ICP may detect a fault of the second driving circuit row through output data signals output from the driving circuits PXIC21 and PXIC22 included in the second driving circuit row. For example, the integrated circuit panel ICP may receive an output data signal from the driving circuit PXIC21 through the first test line TL1, may compare the output data signal with the first input data signal DIN1 and the second clock signal CLK2 (e.g. a time period of the second clock signal provision), and may determine a fault of the driving circuit PXIC21. Also, the integrated circuit panel ICP may receive an output data signal from the driving circuit PXIC22 through the second test line TL2, may compare the output data signal with the second input data signal DIN2 and the second clock signal CLK2 (e.g. a time period of the first clock signal provision), and may determine a fault of the driving circuit PXIC22. Accordingly, the integrated circuit panel ICP may detect faults of the driving circuits PXIC21 and PXIC22 of the second driving circuit row.

In an embodiment, the order of performing operation S230, operation S240, and operation S250 may be changed, and the integrated circuit panel ICP may operate based on the changed order of operation S230, operation S240, and operation S250.

Figure 11:
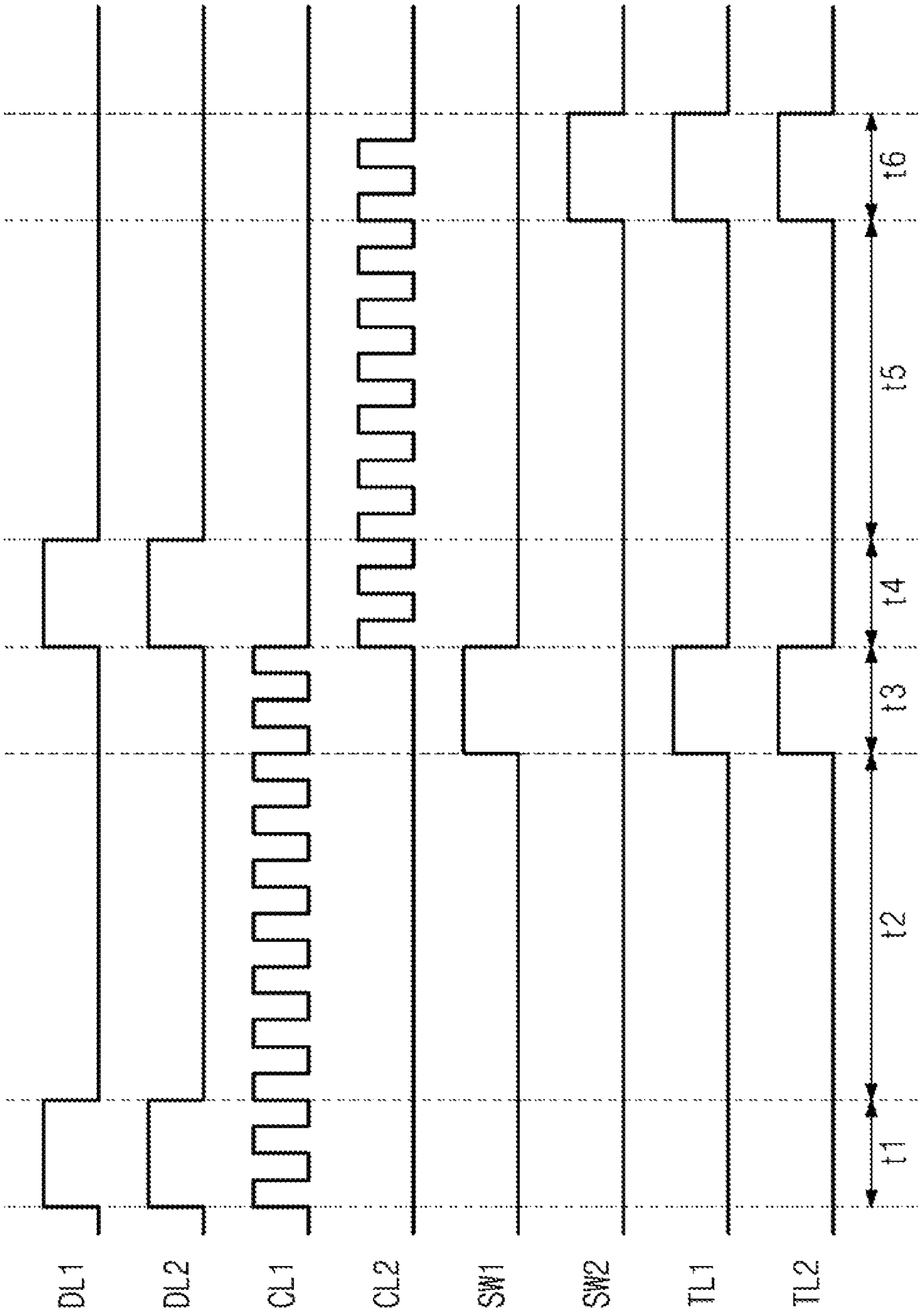
FIG. 11 is a timing diagram illustrating signals of a driving circuit array of FIG. 6, according to an embodiment.

FIG. 11 is a timing diagram illustrating signals associated with driving circuits of FIG. 6, according to an embodiment. For brief description, signals associated with the driving circuits PXIC11, PXIC12, PXIC21, and PXIC22 located at the first and second driving circuit rows and the first and second driving circuit columns from among the driving circuits PXIC11 to PXIC33 illustrated in FIG. 6 will be described with reference to FIG. 11, but the present disclosure is not limited thereto. Below, signals associated with driving circuits will be described with reference to FIGS. 5 to 11.

In a first time period t1, an input data signal DIN may be provided to each driving circuit PXIC to detect a fault of the driving circuit array 100. For example, the driving circuits PXIC11 and PXIC21 may receive the first input data signal DIN1 through the first data line DL1, and the driving circuits PXIC21 and PXIC22 may receive the second input data signal DIN2 through the second data line DL2.

An operation in which the driving circuits PXIC11 to PXIC22 store the received input data signals DIN1 and DIN2 may be controlled by the clock signals CLK1 and CLK2. For example, in first to third time periods t1 to t3, the driving circuits PXIC11 and PXIC12 may receive the first clock signal CLK1 through the first clock line CL1, and a clock signal may not be provided to the driving circuits PXIC21 and PXIC22. In this case, the memory MM of each of the driving circuits PXIC21 and PXIC22 to which the clock signal is not provided may not store an input data signal provided from the corresponding data line DL. Accordingly, in the first to third time periods t1 to t3, the input data signals DIN1 and DIN2 may be respectively stored only in the driving circuits PXIC 11 and PXIC12.

After storing the input data signals DIN1 and DIN2, each of the driving circuits PXIC11 and PXIC12 may provide the error detection driver 600 with an output data signal through a corresponding test line TL when the switching signal SW is input through a corresponding switch line SL. For example, after the input data signals DIN1 and DIN2 are respectively stored in the driving circuits PXIC11 and PXIC12, when the first switching signal SW1 is received through the first switch line SL1, the driving circuits PXIC11 and PXIC12 may provide output data signals to the error detection driver 600 through the first and second test lines TL1 and TL2 in the third time period t3.

In an embodiment, when the first switching signal SW1 is input to the driving circuits PXIC11 and PXIC12, the second switching signal SW2 may not be input to the driving circuits PXIC21 and PXIC22.

In an embodiment, when a fault does not occur in the driving circuits PXIC11 and PXIC12, output data signals output to the error detection driver 600 through the first and second test lines TL1 and TL2 may be identical or similar to the first and second input data signals DIN1 and DIN2. For example, a period and a waveform of the output data signal provided to the error detection driver 600 through the test line TL may be identical to those of the input data signal DIN provided through the data line DL.

In an embodiment, after the fault detecting operation associated with the driving circuits PXIC11 and PXIC12 is completed, a fault detecting operation may be performed on the driving circuits PXIC21 and PXIC22. In this case, a fault detecting operation in which data input signals are stored in the driving circuits PXIC11 and PXIC12 and output data signals are provided to the error detection driver 600 through the first and second test lines TL1 and TL2 is similar to the fault detecting operation associated with the driving circuits PXIC11 and PXIC12, and thus, duplicate descriptions will be omitted to avoid redundancy.

In an embodiment, because a fault detecting operation is sequentially performed for each row and output data signals of driving circuit columns are provided to the error detection driver 600 through different test lines TL, the error detection driver 600 may detect a fault of each of the driving circuits PXIC constituting the driving circuit array 100. For example, the error detection driver 600 may detect a fault of each driving circuit PXIC, based on whether an output data signal is transferred through any test line TL and whether an error occurs in an output data signal in any time period when the output data signal is compared with an input data signal and a clock signal directly provided from the data driver 300 and the line driver 400, respectively. Signals of the driving circuit array 100 when a fault occurs in one of the driving circuits PXIC will be described in detail with reference to FIGS. 13 and 14.

Figure 12:
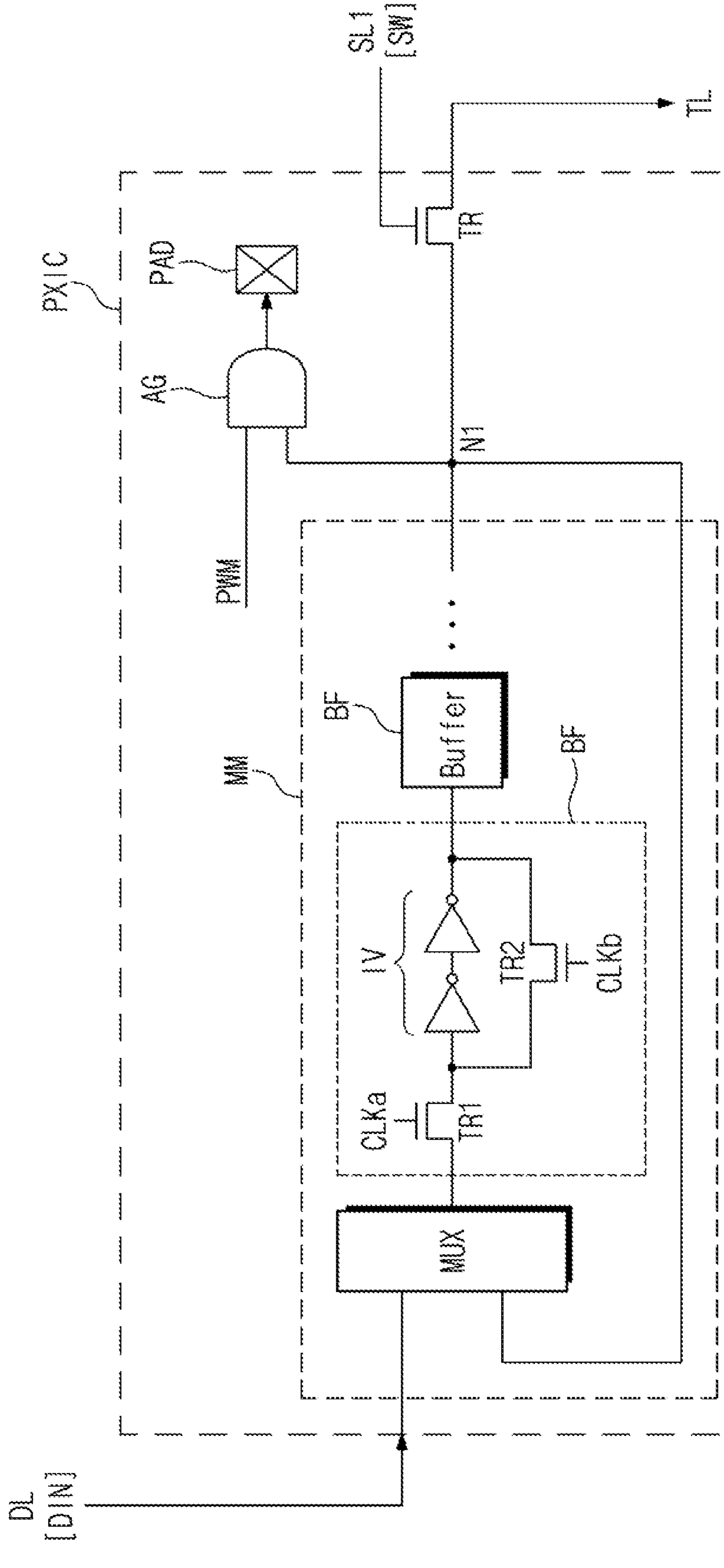
FIG. 12 is a circuit diagram illustrating an embodiment in which a memory of FIG. 7 is implemented with a shift register.

FIG. 12 is a block circuit diagram illustrating an embodiment in which a memory of FIG. 7 is implemented with a shift register. Referring to FIG. 12, the driving circuit PXIC may include the memory MM, the AND gate AG, the data pad PAD, and the transistor TR. The connection relationship and functions of the memory MM, the AND gate AG, the data pad PAD, and the transistor TR are described with reference to FIG. 7, and thus, duplicate descriptions will be omitted to avoid redundancy.

The memory MM may be implemented to include a multiplexer MUX and a buffer string.

A first input terminal of the multiplexer MUX may receive an input data signal DIN through a data line DL. A second terminal of the multiplexer MUX may be connected to the first node N1. An output terminal of the multiplexer MUX may be connected to the buffer string.

The buffer string may include one or more buffers BF. For example, the buffer string may include one or more buffers BF connected in series.

The buffer BF may include first and second transistors TR1 and TR2 and inverters IV. The first transistor TR1 may receive a first clock CLKa through a gate terminal thereof, a source terminal thereof may be connected to the output terminal of the multiplexer MUX, and a drain terminal thereof may be connected to an input of the inverters IV. The inverters IV may be connected in series to form an inverter string, and may be connected to a next buffer BF in parallel with the second transistor TR2. The second transistor TR2 may receive a second clock CLKb through a gate terminal thereof, and a drain terminal thereof may be connected to an output of the inverters IV. In this case, the buffer BF may perform a function of delaying a signal received through the source terminal of the first transistor TR1 as much as a given time.

In an embodiment, the first and second clocks CLKa and CLKb may be provided through the clock line CL of FIG. 7. For example, the first and second clocks CLKa and/or CLKb may be the same signals as the clock signal CLK received through the clock line CL or may be signals generated by clock signal CLK via phase-locked loop (PLL).

An output terminal of the buffer BF (e.g., an output terminal of the inverter string or the drain terminal of the second transistor TR2) may be connected to an input terminal of the next buffer BF. An output terminal of the last buffer BF of the buffer string may be connected to the first node N1.

In an embodiment, unlike the example illustrated in FIG. 12, the driving circuit PXIC may further include one or more buffers BF between the first node N1 and the transistor TR. However, the number of buffers BF included in the driving circuit PXIC or the memory MM is not limited to the present disclosure.

Figure 13:
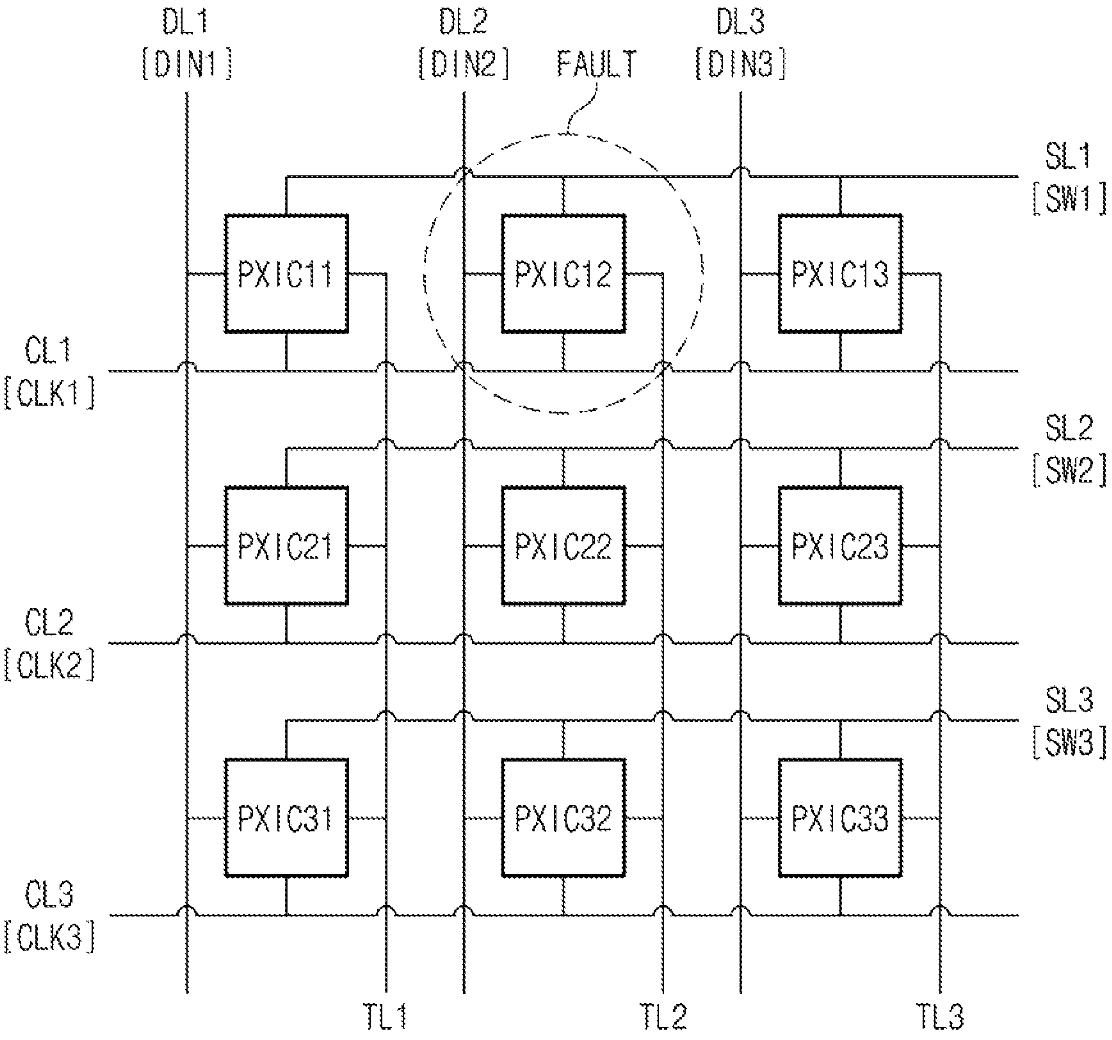
FIG. 13 is a diagram illustrating the case where a fault occurs in one of driving circuits of FIG. 6, according to an embodiment.
Figure 14:
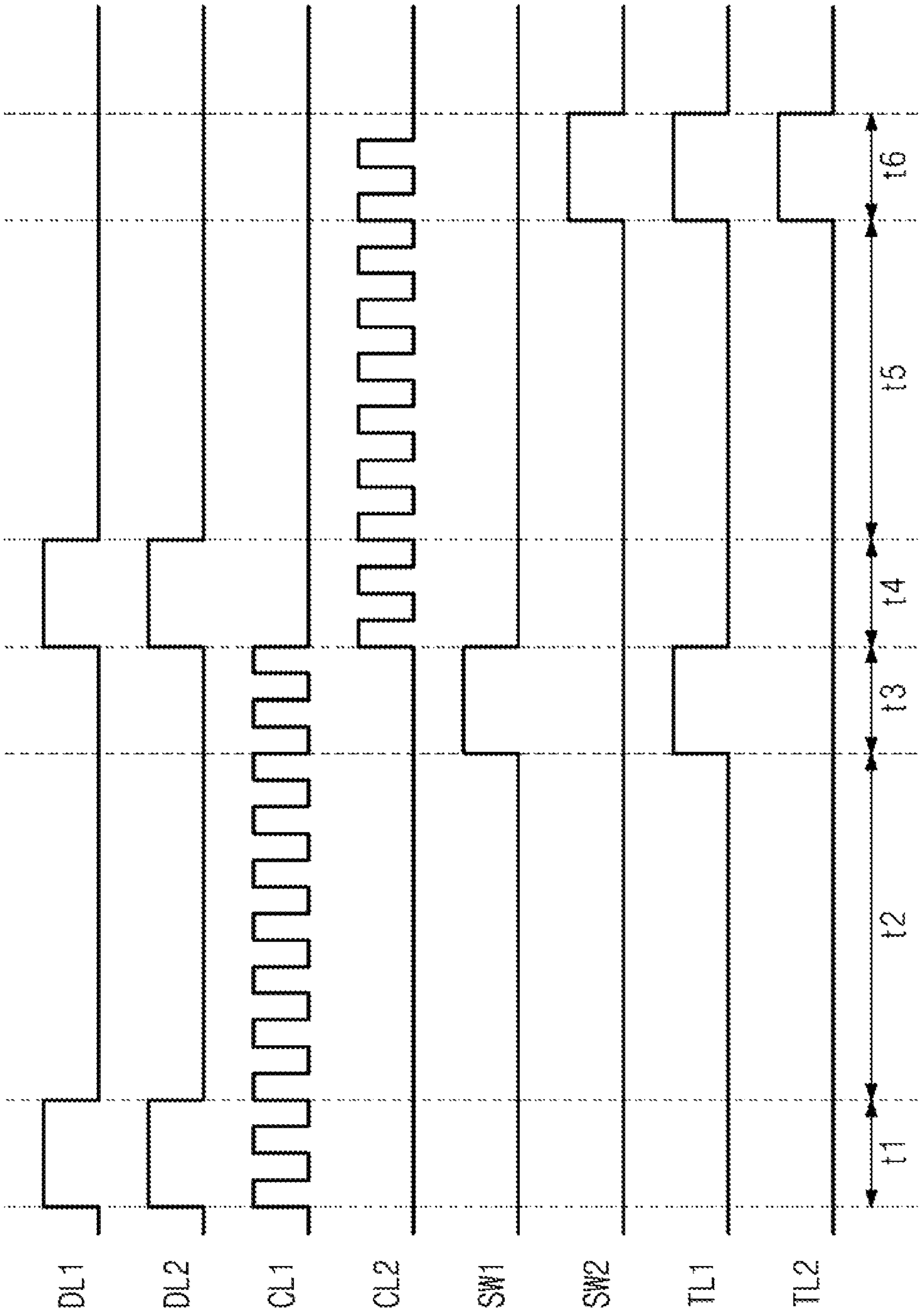
FIG. 14 is a timing diagram illustrating a fault detecting operation associated with a fault driving circuit of FIG. 13, according to an embodiment.

FIGS. 13 and 14 are diagrams illustrating a fault detecting operation when a fault occurs in one of driving circuits of FIG. 6. The functions and connection relationship of the data lines DL, the clock lines CL, the switch lines SL, the test lines TL, and the driving circuits PXIC are described with reference to FIG. 6, and thus, duplicate descriptions will be omitted to avoid redundancy.

Below, signals and a fault detecting operation associated with the case where a fault occurs in the driving circuit PXIC12 located at the first driving circuit row and the second driving circuit column will be described with reference to FIGS. 13 and 14. However, for brief description, signals in the first, second, and fourth to sixth time periods t1, t2, and t4 to t6 associated with the case where a fault does not occur in a driving circuit are identical to those described with reference to FIG. 11, and thus, duplicate descriptions will be omitted to avoid redundancy.

In an embodiment, when a fault occurs in a driving circuit PXIC, a driving voltage corresponding to an input data signal DIN may not be supplied to a corresponding data pad PAD. For example, referring to FIG. 7, when a fault occurs in the driving circuit PXIC, the memory MM may not provide a voltage or a signal to the first node N1, or the memory MM may not store the input data signal DIN in response to the clock signal CLK input thereto. In this case, even though the clock signal CLK and the switching signal SW are provided to the driving circuit PXIC in which the fault occurs, the fault driving circuit PXIC may not transmit an output data signal to the test line TL. For example, a fault driving circuit PXIC12 (marked by "FAULT") may fail to store the second input data signal DIN2 received through the second data line DL2 in response to the first clock signal CLK1 received through the first clock line CL1, or the memory MM may not provide a voltage or a signal to the first node N1. Accordingly, the fault driving circuit PXIC12 may fail to transmit an output data signal to the second test line TL2 in response to the first switching signal SW1 provided from the first switch line SL1.

Referring to FIG. 14, signals that the fault driving circuit PXIC12 receives or transmits in the first, second, and fourth to sixth time periods t1, t2, and t4 to t6 may be identical to the signals illustrated in FIG. 11. However, in the third time period t3, the fault driving circuit PXIC12 may not output an output data signal through the second test line TL2.

In an embodiment, the error detection driver 600 may determine the driving circuit PXIC12 in which a fault occurs, based on the output data signal of the faulty driving circuit PXIC12 received through the second test line TL2, the input data signal received from the data driver 300, and the clock signal received from the line driver 400. For example, the error detection driver 600 may check that a faulty driving circuit PXIC is present in the first driving circuit row of the driving circuit array 100, by detecting an error in the third time period t3 in which the first switching signal SW1 is input to the driving circuit array 100. Also, the error detection driver 600 may check that the faulty driving circuit PXIC is present in the second driving circuit column of the driving circuit array 100, by detecting a fault through the output data signal received through the second test line TL2. Accordingly, the driving circuit PXIC12 in which a fault occurs may be identified from the driving circuit array 100 including a plurality of driving circuits PXIC.

According to the present disclosure, a driving circuit, in which a fault occurs, from among a plurality of driving circuits may be detected. Accordingly, a display apparatus capable of detecting a fault such that the manufacturing yield is improved, and an operation method thereof are provided.

While the present disclosure has been described with reference to example embodiments thereof, it will be apparent to those of ordinary skill in the art that various changes and modifications may be made thereto without departing from the spirit and scope of the inventive concept as set forth in the following claims.

What is claimed is:

1. A display apparatus comprising:
an integrated circuit panel; and
a display panel including a first pixel circuit,
wherein the integrated circuit panel comprises:
a first driving circuit;
a data driver configured to output a first input data signal through a first data line;
a switch driver configured to output a first switching signal through a first switch line; and
an error detection driver configured to receive a first output data signal through a first test line,
wherein the first driving circuit is configured to output a first driving signal to the first pixel circuit based on the first input data signal, and output the first output data signal to the error detection driver through the first test line in response to the first switching signal, and
wherein the error detection driver is configured to detect a fault of the first driving circuit based on the first output data signal.

2. The display apparatus of claim 1, wherein the integrated circuit panel further comprises a line driver configured to output a first clock signal through a first clock line, and wherein, in response to the first clock signal, the first driving circuit is configured to store the first input data signal.

3. The display apparatus of claim 2, wherein the data driver is further configured to output the first input data signal to the error detection driver not by way of the first driving circuit, wherein the line driver is further configured to output the first clock signal to the error detection driver, and wherein the error detection driver is configured to detect the fault of the first driving circuit by comparing the received first output data signal with the first input data signal and the first clock signal.

4. The display apparatus of claim 1, wherein the first driving circuit is configured to output the first output data signal through the first test line during generation of the first driving signal.

5. The display apparatus of claim 1, wherein the integrated circuit panel further comprises a second driving circuit, wherein the display panel further comprises a second pixel circuit, wherein the switch driver is further configured to output a second switching signal through a second switch line, wherein the second driving circuit is configured to output a second output data signal to the error detection driver through the first test line in response to the second switching signal, and wherein the error detection driver is further configured to receive the second output data signal through the first test line and detect a fault of the second driving circuit based on the second output data signal.

6. The display apparatus of claim 5, wherein the display panel further comprises a second pixel circuit, and wherein the second driving circuit is configured to output a second driving signal to the second pixel circuit based on the first input data signal.

7. The display apparatus of claim 5, wherein the integrated circuit panel further comprises a line driver configured to output a first clock signal through a first clock line, and output a second clock signal through a second clock line, wherein, in response to the first clock signal, the first driving circuit is configured to store the first input data signal, and wherein, in response to the second clock signal, the second driving is configured to store the first input data signal.

8. The display apparatus of claim 7, wherein the line driver is further configured to output the first clock signal and the second clock signal at different time periods.

9. The display apparatus of claim 5, wherein a time period in which the switch driver is configured to output the first switching signal is different from a time period in which the switch driver is configured to output the second switching signal.

10. The display apparatus of claim 1, wherein the integrated circuit panel further comprises a third driving circuit, wherein the display panel further comprises a third pixel circuit, wherein the data driver is further configured to output a second input data signal through a second data line;

wherein the third driving circuit is configured to output a third driving signal to the third pixel circuit based on the second input data signal, and output a third output data signal to the error detection driver through a second test line in response to the first switching signal, and wherein the error detection driver is further configured to receive the third output data signal through the second test line and detect a fault of the third driving circuit based on the third output data signal.

11. The display apparatus of claim 1, wherein the first driving circuit comprises:

a memory configured to receive the first input data signal and store the first input data signal; and a signal output circuit configured to output the first driving signal to the first pixel circuit and output the first output data signal to the error detection driver, in response to the first switching signal.

12. The display apparatus of claim 1, wherein the first pixel circuit comprises a first micro light-emitting diode configured to emit a light in response to the first driving signal.

13. A display apparatus comprising:

an integrated circuit panel and a display panel comprising a plurality pixel circuits;

wherein the integrated circuit panel comprises:

a data driver configured to provide a plurality input data signals;

a driving circuit array comprising a plurality driving circuits in a matrix form comprising a plurality driving circuit rows and driving circuit columns, and configured to receive the input data signals through the driving circuit columns, output a plurality driving signals to the plurality pixel circuits based on the input signals and generate output data signals based on the input data signals;

a switch driver configured to provide a plurality switching signals to the driving circuit array through the driving circuit rows; and an error detection driver configured to receive the output data signals from the driving circuit array, and detect a fault of a first driving circuit among the driving circuits based on the output data signals, the input data signals, and the switching signals, and wherein a column where the first driving circuit is positioned is identified based on the output data signals and the input data signals, and a row where the first driving circuit is positioned is identified based on the switching signals.

14. The display apparatus of claim 13, wherein the plurality driving circuits are configured to output the driving signals to corresponding pixel circuits among the plurality pixel circuits, in respectively.

15. The display apparatus of claim 13, wherein the data driver is configured to provide the input data signals at the same time, and wherein the switch driver is configured to provide the switching signals to the driving circuit rows at different time points.

16. The display apparatus of claim 13, wherein the integrated circuit panel further comprises a line driver configured to provide a plurality clock signals to the driving circuit array through the driving circuit rows, and wherein, in response to the clock signals, a driving circuit array is further configured to store the input data signals.

17. The display apparatus of claim 16, wherein the line driver is configured to provide the clock signals at different time periods.

18. The display apparatus of claim 16, wherein the data driver is further configured to output the input data signals to the error detection driver not by way of the driving circuit array, wherein the line driver is further configured to output the clock signals to the error detection driver, and wherein the error detection driver is configured to detect the fault of the first driving circuit by comparing the output data signals with the input data signals and the clock signals.

19. A driving circuit of a display apparatus comprising:

a memory configured to receive an input data signal and store the input data signal in response to a clock signal; and a signal output circuit configured to output a driving signal to a pixel circuit of the display apparatus based on the stored input data, and output the stored input data signal used for detection of the driving circuit, in response to a switching signal.

20. The driving circuit of claim 19, wherein the signal output circuit further comprises:

a pad connected with the pixel circuit;

a logic circuit configured to generate the driving signal based on the stored input data signal and output the driving signal to the pixel circuit through the pad; and a transistor configured to receive the switching signal with a gate terminal and output the stored input data in response to the switching signal.

* * * * *